(12) United States Patent
Park

(10) Patent No.: US 11,716,173 B2
(45) Date of Patent: *Aug. 1, 2023

(54) METHOD AND APPARATUS FOR HARQ OPERATION-SUPPORTING UPLINK DATA TRANSMISSION IN A SPECIAL SUBFRAME IN A WIRELESS COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,894

(22) Filed: Nov. 17, 2021

(65) Prior Publication Data

US 2022/0077965 A1    Mar. 10, 2022

Related U.S. Application Data

(63) Continuation of application No. 16/535,395, filed on Aug. 8, 2019, now Pat. No. 11,212,041, which is a (Continued)

(30) Foreign Application Priority Data

Mar. 31, 2016  (KR) ........................ 10-2016-0039438
Sep. 30, 2016  (KR) ........................ 10-2016-0126854

(51) Int. Cl.
*H04L 27/26*      (2006.01)
*H04L 1/1812*     (2023.01)
(Continued)

(52) U.S. Cl.
CPC .......... *H04L 1/1812* (2013.01); *H04L 1/1822* (2013.01); *H04L 1/1887* (2013.01);
(Continued)

(58) Field of Classification Search
None
See application file for complete search history.

(56) References Cited

U.S. PATENT DOCUMENTS 10,454,624 B2 *  10/2019  Park ....................... H04L 5/0048
11,212,041 B2 *  12/2021  Park ....................... H04L 1/1822
(Continued)

FOREIGN PATENT DOCUMENTS

WO     2015108008 A1   7/2015
WO     2015113613 A1   8/2015

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211 V13.1.0, Mar. 2016, pp. 1-155, 3GPP.

(Continued)

*Primary Examiner* — Jason E Mattis
*Assistant Examiner* — Bao G Nguyen

(57) ABSTRACT

Provided is a method of transmitting a Physical Uplink Shared Channel (PUSCH) in a special subframe by a User Equipment (UE). The method includes receiving an Uplink (UL) grant from a base station, the UL grant being included in a downlink time period of Time Division Duplex (TDD) cell, wherein the TDD cell having TDD UL/DL configuration 1, 2 or 6; determining a resource in an Uplink Pilot Time Slot (UpPTS) of a special subframe of the TDD cell to transmit a PUSCH associated with the received UL grant, wherein the special subframe, having subframe number 1 or 6, consists of a Downlink Pilot Time Slot (DwPTS), a guard
(Continued)

period (GP), and the UpPTS; transmitting, from the UE, the PUSCH mapped to the resource in the UpPTS; and receiving a Physical Hybrid Automatic Repeat Request Indicator Channel (PHICH) responsive to the PUSCH.

16 Claims, 13 Drawing Sheets

Related U.S. Application Data continuation of application No. 15/474,373, filed on Mar. 30, 2017, now Pat. No. 10,454,624.

(51) Int. Cl.
*H04L 5/14* (2006.01)
*H04L 5/00* (2006.01)
*H04L 1/1822* (2023.01)
*H04L 1/1867* (2023.01)
*H04W 72/0446* (2023.01)
*H04W 72/21* (2023.01)
*H04W 72/23* (2023.01)
*H04W 88/02* (2009.01)

(52) U.S. Cl.
CPC .......... *H04L 5/0048* (2013.01); *H04L 5/1469* (2013.01); *H04L 27/2601* (2013.01); *H04W 72/0446* (2013.01); *H04W 72/21* (2023.01); *H04W 72/23* (2023.01); *H04W 88/02* (2013.01)

(56) References Cited

U.S. PATENT DOCUMENTS

| | | |
|---|---|---|
| 2014/0092921 A1 | 4/2014 | Seo et al. |
| 2015/0043392 A1 | 2/2015 | Susitaival et al. |
| 2015/0085723 A1 | 3/2015 | Chen et al. |
| 2016/0081107 A1* | 3/2016 | Yang ................ H04L 5/0053 370/280 |
| 2017/0288841 A1 | 10/2017 | Park |

OTHER PUBLICATIONS

"3rd Generation Partnership Project; Technical Specification Group Radio Access Network; Evolved Universal Terrestrial Radio Access (E-UTRA); Physical layer procedures (Release 13)," 3GPP TS 36.213 V13.1.0, Mar. 2016, pp. 1-361, 3GPP.

Notification of Transmittal of the International Search Report and the Written Opinion of the International Searching Authority, or the Declaration of PCT Application (PCT/KR2017/003489).

* cited by examiner

METHOD AND APPARATUS FOR HARQ OPERATION-SUPPORTING UPLINK DATA TRANSMISSION IN A SPECIAL SUBFRAME IN A WIRELESS COMMUNICATION SYSTEM

CROSS-REFERENCE TO RELATED APPLICATIONS

This application is a continuation of U.S. patent application Ser. No. 16/535,395, filed on Aug. 8, 2019, which is a continuation of U.S. patent application Ser. No. 15/474,373, filed on Mar. 30, 2017, which claims priority from and the benefit of Korean Patent Application Nos. 10-2016-0039438, filed on Mar. 31, 2016, and 10-2016-0126854, filed on Sep. 30, 2016, which are hereby incorporated by reference in their entirety.

BACKGROUND

1. Field

The present disclosure relates to a wireless communication system and, more particularly, to a HARQ operation method, apparatus, software, or recording medium storing software, which supports uplink data transmission in a special subframe.

2. Discussion of the Background

A wireless communication system may support a Frequency Division Duplex (FDD) frame structure and a Time Division Duplex (TDD) frame structure. In the TDD frame structure, a single radio frame may include a subframe for a downlink (DL), a subframe for an uplink (UL), and a special subframe.

There is a need for various protocols and resource configurations for the FDD and TDD frame structures to enhance more efficient allocation of channels and resources.

SUMMARY

The present disclosure provides a HARQ operation method and apparatus based on a timing relationship between a PUSCH transmission and HARQ feedback information reception, which is defined for a TDD UL-DL configuration in order to support an uplink data transmission in a special subframe of a TDD frame structure.

An exemplary embodiment provides a method of transmitting a Physical Uplink Shared Channel (PUSCH) in a special subframe by a User Equipment (UE), the method including: receiving an Uplink (UL) grant from a base station, the UL grant being included in a downlink time period of Time Division Duplex (TDD) cell, wherein the TDD cell having TDD UL/DL configuration 1, 2 or 6; determining a resource in an Uplink Pilot Time Slot (UpPTS) of a special subframe of the TDD cell to transmit a PUSCH associated with the received UL grant, wherein the special subframe, having subframe number 1 or 6, consists of a Downlink Pilot Time Slot (DwPTS), a guard period (GP), and the UpPTS; transmitting, from the UE, the PUSCH mapped to the resource in the UpPTS; and receiving a Physical Hybrid Automatic Repeat Request Indicator Channel (PHICH) responsive to the PUSCH.

An exemplary embodiment provides a method of transmitting a Physical Uplink Shared Channel (PUSCH) in a special subframe by a User Equipment (UE), the method including: receiving an Uplink (UL) grant from a base station, the UL grant being included in a downlink time period of Time Division Duplex (TDD) cell; determining a resource in an Uplink Pilot Time Slot (UpPTS) of a special subframe of the TDD cell to transmit a PUSCH associated with the received UL grant, wherein the special subframe, having subframe number 1, consists of a Downlink Pilot Time Slot (DwPTS), a guard period (GP), and the UpPTS; transmitting, from the UE, the PUSCH mapped to the resource in the UpPTS; and receiving a Physical Hybrid Automatic Repeat Request Indicator Channel (PHICH) responsive to the PUSCH. When the TDD cell having TDD UL/DL configuration 1 or 6, the UL grant was received in a downlink subframe having subframe number 5, and when the TDD cell having TDD UL/DL configuration 2, the UL grant was received in a special subframe having subframe number 6.

BRIEF DESCRIPTION OF THE DRAWINGS

FIG. 2 through FIG. 10 are diagrams illustrating a HARQ timing capable of supporting a PUSCH transmission in a special subframe based on a TDD UL-DL configuration according to the present disclosure.

DETAILED DESCRIPTION OF THE ILLUSTRATED EMBODIMENTS

Figure 1:
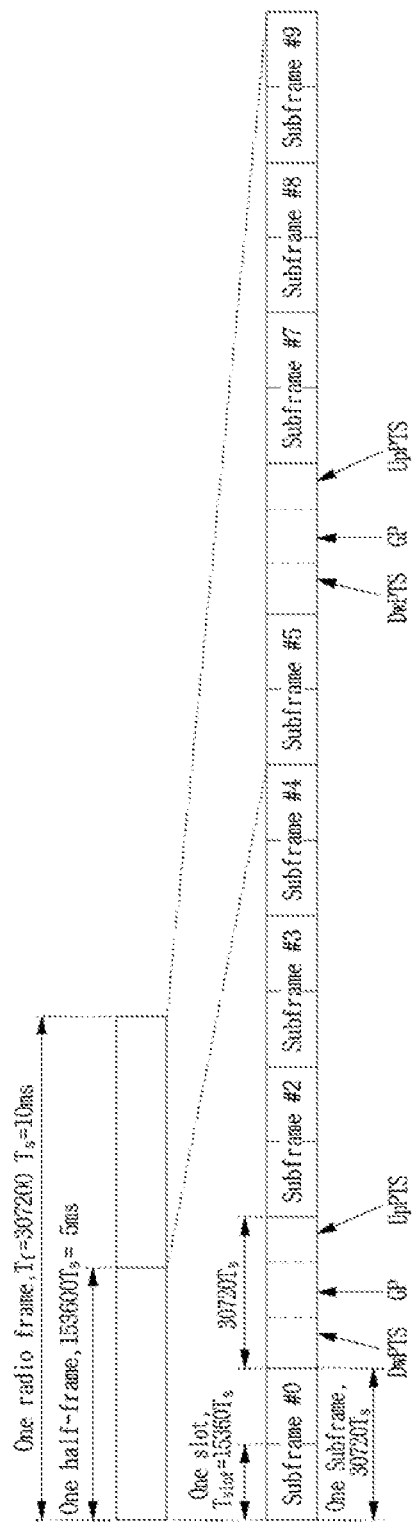
FIG. 1 is a diagram illustrating an example of a radio frame structure according to the present disclosure.

FIG. 1 is a diagram illustrating an example of a radio frame structure according to the present disclosure. A frame structure as shown in FIG. 1 may be referred to as frame structure type 2, and an FDD frame structure may be referred to as frame structure type 1. The example in FIG. 1 corresponds to a TDD frame structure assuming a 5 ms switch-point period. Each radio frame has 10 subframes having subframe numbers 0, 1, 2, ..., 9, respectively. When n+k is greater than 9 and subframe n is included in radio frame M, subframe n+k is subframe n+k−10 of radio frame M+1. When n−k is negative integer value and subframe n is included in radio frame M, subframe n−k is subframe n−k+10 of radio frame M−1.

A single radio frame is formed of two half-frames. The length of each half-frame is $153600T_s=5$ ms, and the length of a single radio frame is $T_f=307200T_s=10$ ms. Each half-frame may include five subframes. A subframe may be one of a DL subframe, a UL subframe, or a special subframe. A special subframe is formed of a DwPTS, a GP, and an UpPTS. The DwPTS is used for a DL transmission. The GP is a guard period for switching from a DL to a UL. The UpPTS is used for a UL transmission. In the DwPTS, a DL data transmission, such as a PDSCH transmission, may be supported (e.g., special subframe configurations excluding special subframe configurations #0 and #5 in the case of a normal Cyclic Prefix (CP), and special subframe configurations excluding special subframe configurations #0 and #4 in the case of an extended CP in Table 1). In the UpPTS, UL data transmission is not allowed and only RS transmission, such as Sounding RS (SRS), is allowed.

Table 1 illustrates a special subframe configuration. Particularly, Table 1 includes the lengths of a DwPTS, a GP, and an UpPTS.

TABLE 1

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

A special subframe includes a Downlink Pilot Time Slot (DwPTS), a Guard Period (GP), and an Uplink Pilot Time Slot (UpPTS).

In a wireless communication system, a DL data transmission is allowed in a DwPTS, a UL data transmission is not allowed, and only a Reference Signal (RS) transmission is allowed in an UpPTS. In order to implement methods for allowing a UL data transmission (e.g., Physical Uplink Shared Channel (PUSCH) transmission) in a special subframe, the structure of the special subframe illustrated in Table 1 may be modified. In one or more embodiments, a detailed method for a new UL Hybrid Automatic Repeat Request (UL HARQ) operation for supporting a UL data transmission in a special subframe will be provided. According to ten illustrative configurations as shown in Table 1, periods for the DwPTS, GP, and UpPTS may be defined for a normal CP or an extended CP. Table 1 is merely an example, and the present disclosure does not exclude adding a new special subframe configuration to the example in Table 1.

In the special subframe structure that the present disclosure representatively assumes, the present disclosure considers allocating six OFDM symbols for a DwPTS, two OFDM symbols for a GP, and the remaining symbols for an UpPTS. Because the duration of one subframe is 1 ms, which has 14 OFDM symbols for normal cyclic prefix, a UpPTS may have six OFDM symbols for normal cyclic prefix in uplink (or a UpPTS may have five OFDM symbols for extended cyclic prefix in uplink) when a DwPTS has six OFDM symbols ($13168 \cdot T_s$) for normal cyclic prefix in downlink as shown in Table 1 and a GP has two OFDM symbols.

Table 2 provided below illustrates a UL-DL configuration.

TABLE 2

| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 2 illustrates a type of subframe (i.e., a DL, a UL, or a special subframe) set for each of the ten subframes of a single radio frame. D denotes a DL subframe, U denotes a UL subframe, and S denotes a special subframe. The ratio of D, U, and S in a single radio frame may be different according to the UL-DL configuration. A configuration may be indicated to terminals in a cell by semi-static signaling (e.g., higher layer signaling, such as System Information Block (SIB) signaling or Radio Resource Control (RRC) signaling). In the case of user equipment (UE) to which an enhanced Interference Mitigation and Traffic Adaptation (eIMTA) function is set, a UL-DL configuration as described above may be indicated by a Downlink Control Information (DCI) format IC that is scrambled using dynamic signaling (e.g., a Radio Network Temporary Identifier (eIMTA-RNTI)).

To support a UL PUSCH transmission in a special subframe, a mechanism for the special subframe includes a DwPTS occupying six Orthogonal Frequency Division Multiplexing (OFDM) symbols and a GP occupying two OFDM symbols; radio frequency (RF) requirements are determined for the same; and compatibility with a UE that does not support UL data transmission in a special subframe needs to be provided.

As described above, to support a UE's PUSCH transmission in a special subframe in a TDD serving cell, new UL HARQ timing needs to be defined. Hereinafter the present disclosure will describe a new HARQ timing for a PUSCH transmission in a special subframe according to a TDD UL-DL configuration, as well as a DCI format configuration and signaling method for supporting the same.

FIG. 2 through FIG. 10 are diagrams illustrating a HARQ timing capable of supporting a PUSCH transmission in a special subframe based on a TDD UL-DL configuration according to the present disclosure.

Hereinafter, the following expressions are defined for ease of description.

G: denotes uplink (UL) grant. The UL grant may be included in DCI format 0 or DCI format 4 transmitted through a Physical Downlink Control Channel (PDCCH) or an Enhanced PDCCH (EPDCCH).

P: denotes a Physical HARQ Indicator Channel (PHICH) that delivers HARQ-ACK information transmitted in response to UL data. G (UL grant) may be transmitted in a subframe in which P (PHICH) is transmitted.

U: denotes an initial PUSCH transmission.

R: denotes a retransmission of a PUSCH.

D: denotes a DL subframe.

U: denotes a UL subframe.

S: denotes a special subframe.

RF: denotes a radio frame.

HARQ process #X-Y: X denotes a HARQ process number and Y denotes a method of the corresponding HARQ process number. That is, the present disclosure defines one or more methods for a single HARQ process number.

A HARQ operation according to the present disclosure may have a different HARQ period based on a TDD UL-DL configuration and the settings of normal HARQ operation. Descriptions will be provided by assuming that a HARQ period is 70 ms in TDD UL-DL configuration #0; the HARQ period is 60 ms in TDD UL-DL configuration #6; and the HARQ period is 20 ms in TDD UL-DL configurations #1-5.

Also, in the present disclosure, $I_{PHICH}$ is an index for distinguishing different PHICH resources in the same subframe on the same serving cell, which is associated with HARQ timing. That is, in a relationship between a PUSCH and a PHICH defined by HARQ timing proposed in the present disclosure, $I_{PHICH}$ is used for determining a PHICH resource in a subframe in which a PHICH is transmitted after a PUSCH transmission performed in a predetermined subframe. Therefore, $I_{PHICH}$ is defined according to a subframe in which a PUSCH is transmitted in the relationship between a PUSCH and a PHICH, and may be taken into consideration for determining transmission timings of a PHICH and a retransmission PUSCH.

Figure 2:
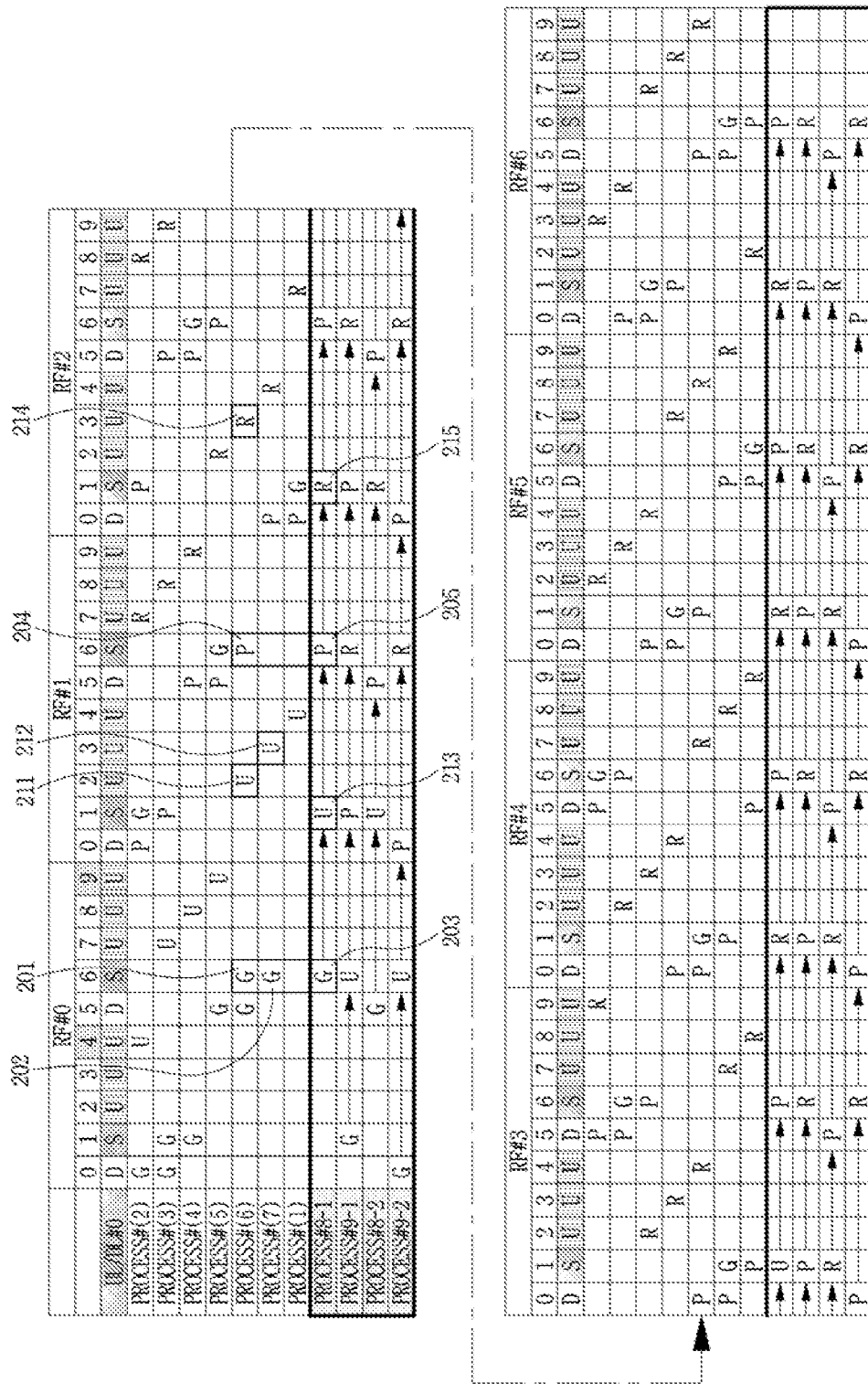

For example, referring to FIG. 2 of the present disclosure, according to TDD UL-DL configuration #0, the $I_{PHICH}$ index for a PHICH associated with a PUSCH transmitted in a subframe 1 has a value of 1. A PHICH having the $I_{PHICH}$ index of 1 is transmitted in a subframe 6 (embodiment 1-1, based on n+5) and an associated PUSCH retransmission is executed in a subframe 1 (embodiment 1-1, based on n+5) in a subsequent radio frame.

Hereinafter, all uplink HARQ timing values are designed in a way (backward compatibility) that least affects existing UEs. The uplink HARQ timing values are designed to provide: a lower HARQ delay time (uplink transmission and retransmission timing of a UE) to maximize uplink data transmission rates of new UEs capable of performing an uplink transmission in a special subframe; the least effect to the size of DCI formats 0 or 4; PHICH resource collision avoidance; and the like.

Embodiment 1

The present embodiment 1 illustrates an example of TDD UL-DL configuration #0 and normal HARQ operation.

FIG. 2 illustrates a UL grant PUSCH-PHICH timing relationship in a 70 ms HARQ period in a special subframe (S) according to TDD UL-DL configuration #0. Processes #2, 3, 4, 5, 6, 7, and 1 are TDD HARQ processes for reference, and HARQ processes #8-1, 9-1, 8-2, and 9-2 correspond to new HARQ timings proposed in the present disclosure.

In TDD UL-DL configuration #0 and with normal HARQ operation, the new HARQ processes #8-1 and 8-2 are different methods (options) for subframe #1 (S). Also, HARQ processes #9-1 and 9-2 are different methods (options) for subframe #6 (S).

Embodiment 1-1

The present embodiment 1-1 relates to HARQ process #8-1 or HARQ process #9-1. In this section, a UL Grant-PUSCH timing relationship will be described.

In TDD UL-DL configuration #0 and with normal HARQ operation, the following timing is provided. Hereinafter, the timing of a PUSCH transmission subframe will be described based on a subframe n in which one or more of a UL grant (G) and a PHICH (P) is received.

In one example, a PUSCH transmission is performed in a subframe n+k. To this end, the Most Significant Bit (MSB) of a UL index field which is defined by 3 bits in DCI format 0 or 4 may be set to 1, or a PHICH corresponding to $I_{PHICH}$=0 may be received in a subframe 0 or 5. Here, k may be defined as listed in Table 3 provided below. Alternatively, a PUSCH transmission may be performed in a subframe n+k. To this end, the Most Significant Bit (MSB) of a UL index field which is defined by 2 bits in DCI format 0 or 4 may be set to 1, or a PHICH corresponding to $I_{PHICH}$=0 may be received in a subframe 0 or 5. Here, k may be defined as listed in Table 3 provided below.

TABLE 3

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |

In another example, a PUSCH transmission may be performed in a subframe n+7. To this end, the Least Significant Bit (LSB) of a UL index field which is defined by 3 bits in DCI format 0 or 4 may be set to 1, a PHICH corresponding to $I_{PHICH}$=1 may be received in a subframe 0 or 5, or a PHICH corresponding to $I_{PHICH}$=0 may be received in a subframe 1 or 6. Alternatively, a PUSCH transmission may be performed in a subframe n+7. To this end, the Least Significant Bit (LSB) of a UL index field which is defined by 2 bits in DCI format 0 or 4 may be set to 1, a PHICH corresponding to $I_{PHICH}$=1 may be received in a subframe 0 or 5, or a PHICH corresponding to $I_{PHICH}$=0 may be received in a subframe 1 or 6.

In another example, a PUSCH transmission may be performed in a subframe n+5. To this end, the value of a middle bit excluding the MSB and the LSB of a UL index field which is defined by 3 bits in DCI format 0 or 4 may be set to 1, or a PHICH corresponding to $I_{PHICH}$=1 may be received in a subframe 1 or 6. Alternatively, when a UE receives an (E)PDCCH including DCI format 0 or 4 in a subframe n=1 or n=6, a PUSCH transmission may be performed in a subframe n+5. To indicate the same, the MSB bit value and the LSB bit value of a UL index field which is defined by 2 bits in DCI format 0 or 4 may be set to 0, or a PHICH corresponding to $I_{PHICH}$=1 may be received in a subframe 1 or 6.

A method of utilizing a 2-bit UL index in DCI format 0 or 4 does not increase the total number of bits of the DCI format 0 or 4 when compared to a method of using 3 bits. Accordingly, a more reliable (E)PDCCH detection may be provided to a UE, which is an advantage.

For the above examples, in the case of TDD UL-DL configuration 0 with PUSCH transmission in subframe n=1, 4, 6 or 9, $I_{PHICH}$ may be 1. Otherwise, $I_{PHICH}$ may be 0.

For example, as illustrated in FIG. 2, a UE may receive at least one UL grant 201, 202, and 203 indicating three PUSCH transmission timings in the subframe 6 of radio frame #0. When the MSB of the UL grant UL index field 201, 202, and 203 is set to 1, a transmission timing n (subframe 6)+k (k determined based on Table 3 is 6) 211 is determined as a PUSCH transmission timing n+k (Table 3) with respect to the UL grant 201.

Additionally or alternatively, when the LSB of the UL grant UL index field 202 is set to 1, a PUSCH transmission timing is n+7 212.

Additionally or alternatively, when a bit remaining after excluding the MSB/LSB of the UL index field in the UL grant 203 is set to 1, or when both of the MSB/LSB bits of the UL index field of the UL grant 203 are set to 0, a PUSCH transmission timing is n+5 213.

From the perspective of a PHICH, when a PHICH corresponding to $I_{PHICH}=0$ is received in a subframe 6 in the diagram 204, a transmission timing n (subframe 6)+k (k determined based on Table 3 is 7) 214 is determined as a PUSCH transmission timing associated with the PHICH based on n+k (Table 3). Additionally or alternatively, when a PHICH corresponding to $I_{PHICH}=1$ is received in a subframe 6 in the diagram 205, a PUSCH transmission timing associated with the PHICH may be n+5 215. Additionally or alternatively, when a PHICH corresponding to $I_{PHICH}=2$ is received in a subframe 0 or 5 in diagrams 220 and 221, a PUSCH transmission timing associated with the PHICH may be n+4.

Hereinafter, the timing of a subframe (k) associated with a UL grant (G), a PHICH (P), a PUSCH transmission (U), and a retransmission (R) of the PUSCH may be applied in the same or a similar method as described above according to the following corresponding condition (and defined table). When a UE receives an (E)PDCCH that has a 3-bit UL index field of which a value in DCI format 0 or 4 is set to "111" in a subframe n, PUSCH transmissions may be performed in the subframe n+k, the subframe n+7, and the subframe n+5 of the above examples.

Alternatively, when a UL index field is defined by 2 bits instead of 3 bits, a UE may receive at least one UL grant 201, 202, and 203 which indicates three PUSCH transmission timings in subframe 6 of radio frame #0, as illustrated in FIG. 2. When the MSB of the UL index field in the UL grant 201 is set to 1, a PUSCH transmission timing is n+k (based on Table 3). Additionally or alternatively, when the LSB of the UL index field of the UL grant 202 is set to 1, a PUSCH transmission timing is n+7. Additionally or alternatively, when the MSB/LSB of the UL index field in the UL grant 203 is set to 0 in a subframe n=1 or 6, a PUSCH transmission timing is n+5 as shown in the proposed HARQ process #8-1 or HARQ process #9-1.

When a UE receives an (E)PDCCH that has a 2-bit UL index field of which a value in DCI format 0 or 4 is set to "11" in a subframe n, PUSCH transmissions may be performed in the subframe n+k, the subframe n+7, and the subframe n+5 (existing only when subframe n=1 or n=6) of the above examples. Alternatively, PUSCH transmissions may be performed in only the subframe n+k and the subframe n+7 (excluding the subframe n+5).

Next, a PUSCH-PHICH timing relationship will be described.

When a PUSCH is transmitted in a subframe n on a serving cell c, an evolved Node B (eNB) may perform a PHICH transmission through a serving cell where a UL grant has been transmitted in a subframe $n+k_{PHICH}$. This transmission may proceed through a serving cell c in the case of a self-carrier scheduling and through another serving cell in the case of a cross-carrier scheduling if Carrier Aggregation (CA) is applied. Here, $k_{PHICH}$ may be defined as listed in Table 4 provided below. According to this method, PHICH transmission timings are evenly distributed to downlink subframes or to special subframes (DwPTS) capable of performing a downlink transmission in a single radio frame, and thus, a balanced PHICH resource configuration may be provided to a new TDD UE.

TABLE 4

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | | 5 | 4 | 7 | 6 | | 5 | 4 | 7 | 6 |

Figure 3:
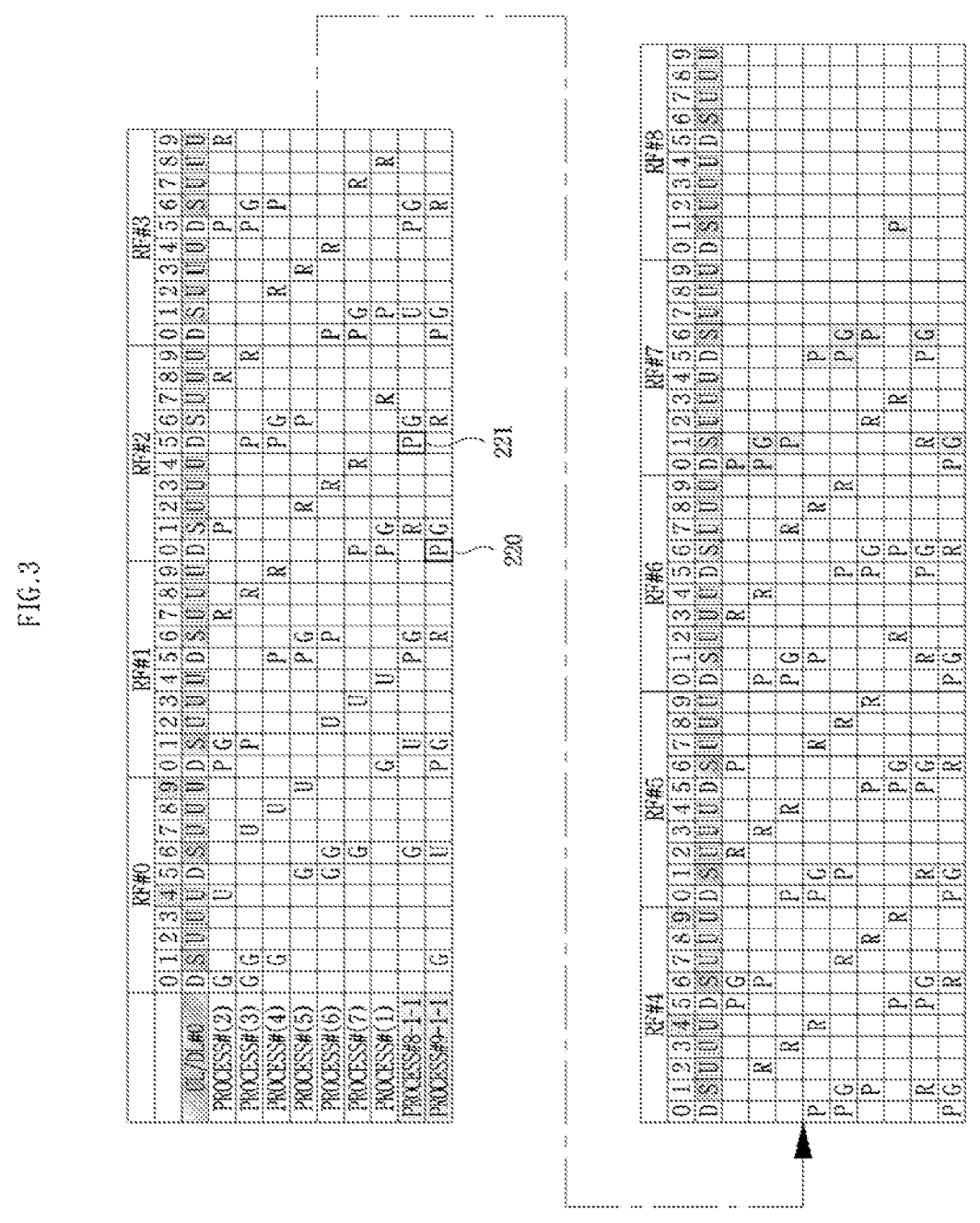

In another PHICH transmission timing method, a new $k_{PHICH}$ value may be defined as shown in Table 5 and FIG. 3 so as to perform a PHICH transmission in a downlink subframe where a PHICH resource area already exists. By separating a PHICH transmission timing associated with a retransmission from a UL grant transmission timing, an uplink data scheduling of an eNB may be flexibly embodied.

TABLE 5

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | | 4 | 4 | 7 | 6 | | 4 | 4 | 7 | 6 |

Next, a PHICH-PUSCH association will be described.

A PHICH-PUSCH association is a PUSCH transmission associated with HARQ-ACK information detected through a PHICH.

In one example, a PHICH in a resource corresponding to $I_{PHICH}=0$ (which is allocated to a UE in a subframe i in TDD UL-DL configuration 0) is associated with a PUSCH transmission in a subframe i-k. Here, k may be defined as listed in Table 6 provided below.

TABLE 6

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | | 7 | 4 | | | | 7 | 4 | | |

In another example, in the case of a subframe i=0 or 5 for TDD UL-DL configuration 0, a PHICH in a resource corresponding to $I_{PHICH}=1$ (which is allocated to a UE in the subframe i) is associated with a PUSCH transmission in a subframe i-6.

In another example, in the case of a subframe i=0 or 5 for TDD UL-DL configuration 0, a PHICH in a resource corresponding to $I_{PHICH}=1$ (which is allocated to a UE in the subframe i) is associated with a PUSCH transmission in a subframe i-6, and a PHICH in a resource corresponding to $I_{PHICH}=2$ is associated with a PUSCH transmission in a subframe i-4.

In another example, in the case of a subframe i=1 or 6 for TDD UL-DL configuration 0, a PHICH in a resource corresponding to $I_{PHICH}=1$ (which is allocated to a UE in the subframe i) is associated with a PUSCH transmission in a subframe i-5.

Embodiment 1-2

Embodiment 1-2 relates to HARQ process #8-2 or HARQ process #9-2.

Next, a UL Grant-PUSCH timing relationship will be described.

In TDD UL-DL configuration #0 and with normal HARQ operation, the following timing is provided. Hereinafter, the timing of a PUSCH transmission subframe will be described based on a subframe n in which one or more of a UL grant (G) and a PHICH (P) is received.

In one example, a PUSCH transmission is performed in a subframe n+k. To this end, the MSB of a UL index field which is defined by 3 bits in DCI format 0 or 4 may be set to 1, or a PHICH corresponding to $I_{PHICH}=0$ may be received in a subframe 0 or 5. Here, k may be defined as listed in Table 3 provided below.

In another example, a PUSCH transmission may be performed in a subframe n+7. To this end, the LSB of a UL index field which is defined by 3 bits in DCI format 0 or 4 may be set to 1, a PHICH corresponding to $I_{PHICH}=1$ may be received in a subframe 0 or 5, or a PHICH may be received in a subframe 1 or 6.

In another example, a PUSCH transmission may be performed in a subframe n+6. To this end, the value of a middle bit excluding the MSB and the LSB of a UL index field (which is defined by 3 bits in DCI format 0 or 4) may be set to 1, or a PHICH corresponding to $I_{PHICH}=2$ may be received in a subframe 0 or 5.

In the above described embodiments, the $I_{PHICH}$ value is 1 in the case of TDD UL-DL configuration 0 with PUSCH transmission in subframe n=4 or 9 and the $I_{PHICH}$ value is 2 in the case of TDD UL-DL configuration 0 with PUSCH transmission in subframe n=1 or 6. Otherwise, the $I_{PHICH}$ value is 0.

Unlike embodiment 1-1, three PHICH groups may be generated in a single subframe. Therefore, $I_{PHICH}$ may have a value of 0, 1, or 2, and a PHICH resource allocation may be performed based on the $I_{PHICH}$ value.

When a UE receives an (E)PDCCH that has a 3-bit UL index field of which a value in DCI format 0 or 4 is set to "111" in a subframe n, PUSCH transmissions may be performed in the subframe n+k, the subframe n+7, and the subframe n+6 of the above examples.

Next, a PUSCH-PHICH timing relationship will be described.

When a PUSCH is transmitted in a subframe n on a serving cell c, an eNB may perform a PHICH transmission through a serving cell where a UL grant has been transmitted in a subframe n+$k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 7 provided below.

TABLE 7

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 4 | 7 | 6 | | 4 | 4 | 7 | 6 |

Next, a PHICH-PUSCH association will be described.

A PHICH-PUSCH association is a PUSCH transmission associated with HARQ-ACK information detected through a PHICH.

In one example, a PHICH in a resource corresponding to $I_{PHICH}=0$ (which is allocated to a UE in a subframe i for TDD UL-DL configuration 0) is associated with a PUSCH transmission in a subframe i-k. Here, k may be defined as listed in Table 8 provided below.

TABLE 8

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |

In another example, a PHICH in a resource corresponding to $I_{PHICH}=1$ (which is allocated to a UE in a subframe i for TDD UL-DL configuration 0) is associated with a PUSCH transmission in a subframe i-6.

In another example, a PHICH in a resource corresponding to $I_{PHICH}=2$ (which is allocated to a UE in a subframe i for TDD UL-DL configuration 0) is associated with a PUSCH transmission in a subframe i-4.

Embodiment 1-3

Embodiment 1-3 relates to HARQ processes #8-1 and 8-2 and HARQ processes #9-1 and 9-2. That is, the embodiment 1-3 is a method of utilizing all of the proposed HARQ processes. A difference from the above described embodiments is that a 2-bit UL index field defined in DCI format 0 or 4 is used and an eNB indicates a PUSCH transmission timing to a UE through additional interpretation.

Next, a UL Grant-PUSCH timing relationship will be described.

In TDD UL-DL configuration #0 and normal HARQ operation, the following timing is provided. Hereinafter, the timing of a PUSCH transmission subframe will be described based on a subframe n in which one or both of a UL grant (G) and a PHICH (P) is received.

In one example, a PUSCH transmission is performed in a subframe n+k. To this end, the MSB of a UL index field which is defined by 2 bits in DCI format 0 or 4 may be set to 1, or a PHICH corresponding to $I_{PHICH}=0$ may be received in a subframe 0 or 5. Here, k may be defined as listed in Table 3 provided below.

In another example, a PUSCH transmission may be performed in a subframe n+7. To this end, the LSB of a UL index field which is defined by 2 bits in DCI format 0 or 4 may be set to 1, a PHICH corresponding to $I_{PHICH}=1$ may be received in a subframe 0 or 5, or a PHICH may be received in a subframe 1 or 6.

In another example, when DCI format 0 or 4 corresponding to the UL grant is received in a subframe n=0 or 5 (like HARQ processes #8-2 and #9-2 in FIG. 2), a PUSCH transmission may be performed in a subframe n+6. As another example, when the DCI format 0 or 4 corresponding to the UL grant is received in a subframe n=1 or 6 (like HARQ processes #8-1 and #9-1 in FIG. 2), a PUSCH transmission may be performed in a subframe n+5. To this end, the MSB and the LSB of a UL index field which is defined by 2 bits in DCI format 0 or 4 may be set to 0, or a PHICH corresponding to $I_{PHICH}=2$ may be received in a subframe 0 or 5.

In the above described embodiments, an $I_{PHICH}$ value is 1 in the case of TDD UL-DL configuration 0 with PUSCH transmission in subframe n=4 or 9, and the $I_{PHICH}$ value is 2 in the case of TDD UL-DL configuration 0 with PUSCH transmission in subframe n=1 or 6. Otherwise, the $I_{PHICH}$ value is 0.

Unlike the embodiment 1-1, three PHICH groups may be generated in a single subframe. Therefore, $I_{PHICH}$ may have a value of 0, 1, or 2, and PHICH resource allocation may be performed based on the $I_{PHICH}$ value.

When a UE receives an (E)PDCCH that has a 2-bit UL index field of which a value in DCI format 0 or 4 is set to "11" in a subframe n, PUSCH transmissions may be performed in the subframe n+k and the subframe n+7 (and the subframe n+6 or the subframe n+5) of the above examples. For example, in the case of a subframe n=0 or n=5, PUSCH transmissions may be performed in subframes n+k, n+7, and n+6. In the case of a subframe n=1 or n=6, PUSCH transmissions may be performed in subframes n+k, n+7, and n+5. Conversely, according to the conventional method, when a UE receives an (E)PDCCH that has a 2-bit UL index field of which a value in DCI format 0 or 4 is set to "11" in a subframe n, PUSCH transmissions may be performed in only the subframe n+k and the subframe n+7 (excluding the subframes n+5, and n+6).

Next, a PUSCH-PHICH timing relationship will be described.

When a PUSCH is transmitted in a subframe n on a serving cell c, an eNB may perform a PHICH transmission through a serving cell where a UL grant has been transmitted in a subframe n+$k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 9 provided below. The method provides a new TDD UE with a larger number of PHICH transmission timings than the other methods proposed above, in downlink subframes or special subframes (DwPTS) capable of transmitting a downlink transmission in a single radio frame, thereby providing a flexible PHICH resource indication and raising the data transmission rate.

TABLE 9

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | 4 or 5 | 4 | | 7 | 6 | | 4 or 5 | 4 | 7 | 6 |

In a PUSCH transmission subframe 1 or 6,
when a UL grant transmission indicating a PUSCH transmission in a subframe 1 or 6 is a subframe 6, $k_{PHICH}$ is 5.
when a UL grant transmission indicating a PUSCH transmission in a subframe 1 or 6 is a subframe 5, $k_{PHICH}$ is 4.

Next, a PHICH-PUSCH association will be described.

A PHICH-PUSCH association is a PUSCH transmission associated with HARQ-ACK information detected through a PHICH.

In one example, a PHICH in a resource corresponding to $I_{PHICH}$=0 (which is allocated to a UE in a subframe i for TDD UL-DL configuration 0) is associated with a PUSCH transmission in a subframe i-k. Here, k may be defined as listed in Table 6 provided below.

In another example, in the case of a subframe i=0 or 5 for TDD UL-DL configuration 0, a PHICH in a resource corresponding to $I_{PHICH}$=1 (which is allocated to a UE in the subframe i) is associated with a PUSCH transmission in a subframe i-6.

In another example, in the case of a subframe i=0 or 5 for TDD UL-DL configuration 0, a PHICH in a resource corresponding to $I_{PHICH}$=1 (which is allocated to a UE in the subframe i) is associated with a PUSCH transmission in a subframe i-6, and a PHICH in a resource corresponding to $I_{PHICH}$=2 is associated with a PUSCH transmission in a subframe i-4.

Embodiment 2

The present embodiment 2 is an example associated with TDD UL-DL configuration #1 and normal HARQ operation.

Figure 4:
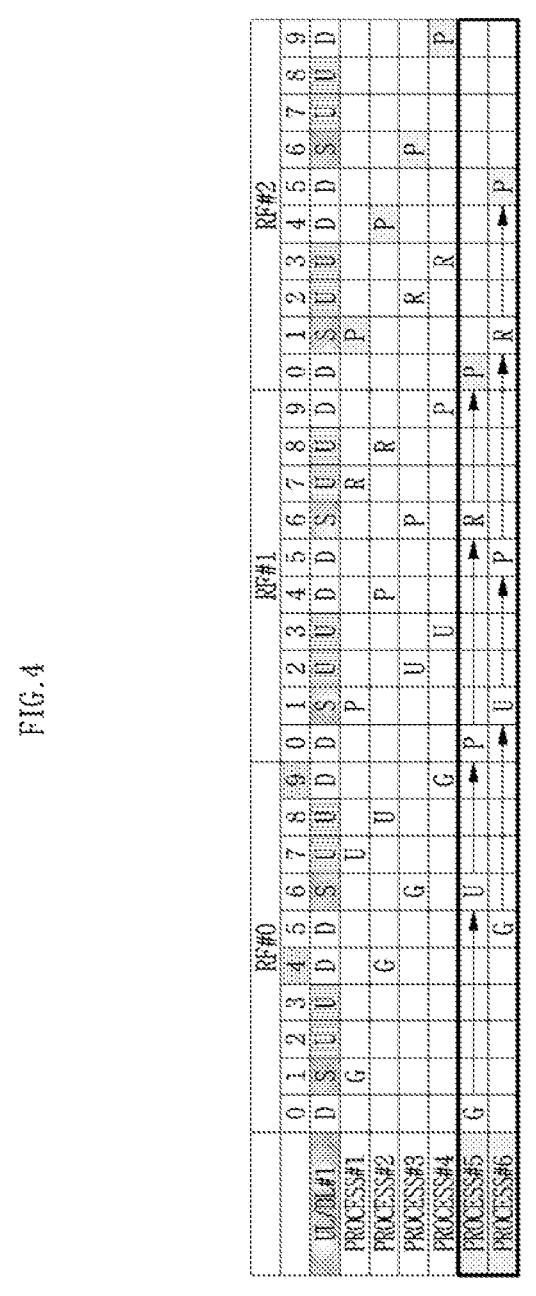

FIG. 4 illustrates a UL Grant-PUSCH-PHICH timing relationship in a 20 ms HARQ period in a special subframe (S), in TDD UL-DL configuration #1. Processes #1, 2, 3, and 4 are TDD HARQ processes, and HARQ processes #5 and 6 correspond to new HARQ timings. Several examples of the present disclosure will be described in association with HARQ processes #5 and 6 in TDD UL-DL configuration #1 and with normal HARQ operation.

Next, a UL Grant-PUSCH timing relationship will be described.

In TDD UL-DL configuration #1 and normal HARQ operation, the following timing is provided. The timing of a PUSCH transmission subframe will be described based on a subframe n in which one or both of a UL grant (G) and a PHICH (P) is received.

For example, a PUSCH transmission may be performed in a subframe n+k. In the timing relationship in TDD UL-DL configuration #1, k may be defined by Table 10 provided below.

TABLE 10

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | 6 | 6 | | 4 | | 6 | 6 | | 4 |

Next, a PUSCH-PHICH timing relationship will be described.

When a PUSCH is transmitted in a subframe n on a serving cell c, an eNB may perform a PHICH transmission through a serving cell where a UL grant has been transmitted in a subframe n+$k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 11 provided below.

TABLE 11

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 1 | | 4 | 4 | 6 | | | 4 | 4 | 6 | |

Figure 5:
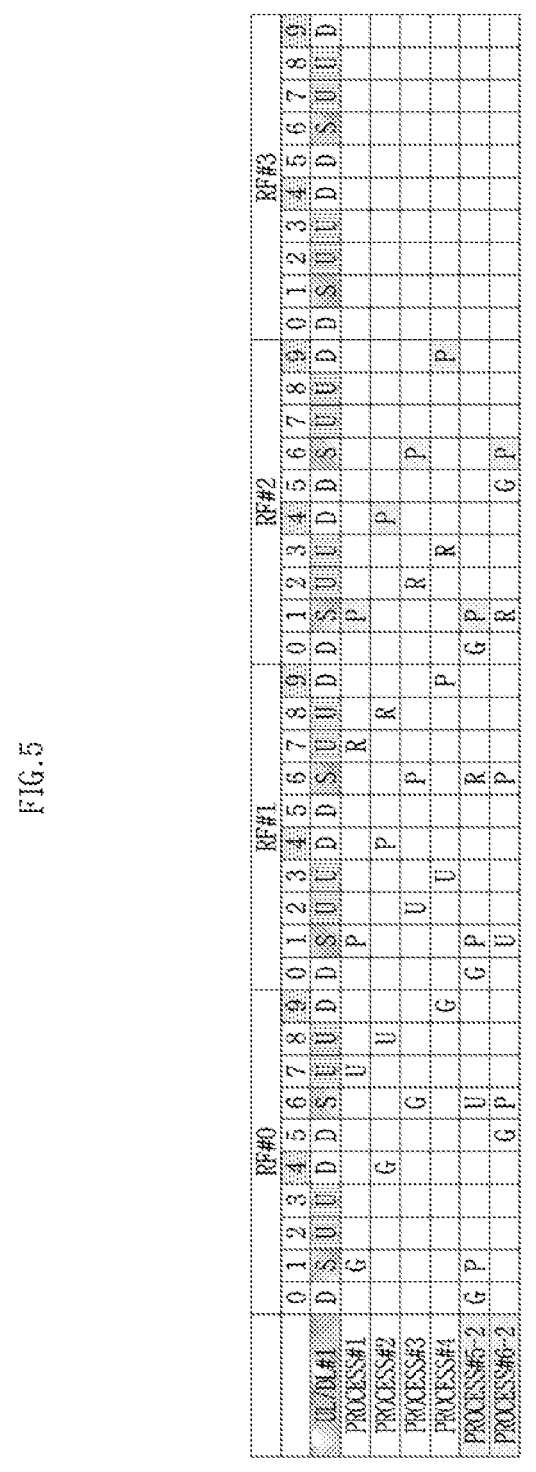

As another PHICH transmission timing method, a new $k_{PHICH}$ value may be defined as shown in Table 12 and FIG. 5 so as to perform a PHICH transmission in a downlink subframe where a PHICH resource area already exists. The proposed method enables new UEs to utilize subframes, which include PHICH resources and which have been defined for existing UEs, and thus, may avoid handling issues associated with backward compatibility, unlike the method that defines a new PHICH area.

TABLE 12

| TDD UL/DL Configuration | subframe number n |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 1 |  | 5 | 4 | 6 |  |  | 5 | 4 | 6 |  |

Hereinafter, a PHICH-PUSCH association will be described.

A PHICH-PUSCH association is a PUSCH transmission associated with HARQ-ACK information detected through a PHICH.

For example, a PHICH in a resource corresponding to $I_{PHICH}=0$ (which is allocated to a UE in a subframe i for TDD UL-DL configuration #1) may be associated with a PUSCH transmission in a subframe i-k. Here, k may be defined as listed in Table 13 provided below.

TABLE 13

| TDD UL/DL Configuration | subframe number i |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 1 |  | 4 | 4 |  |  | 6 | 4 | 4 |  | 6 |

In a method corresponding to the PHICH transmission timing method based on Table 12, a previous PUSCH subframe i-k associated with a PHICH transmission may be defined by the table provided below.

TABLE 14

| TDD UL/DL Configuration | subframe number i |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 1 |  | 4 or 5 |  |  |  | 6 | 4 or 5 |  |  | 6 |

In Table 14, k in a subframe 1 may be defined as below. In the case of a PHICH transmission with respect to a PUSCH transmission in a subframe 7, k=4. In the case of a PHICH transmission with respect to a PUSCH transmission in a subframe 6, k=5.

In Table 14, k in a subframe 6 may be defined as below. In the case of a PHICH transmission with respect to a PUSCH transmission in a subframe 2, k=4. In the case of a PHICH transmission with respect to a PUSCH transmission in a subframe 1, k=5.

Embodiment 3

The present embodiment 3 is an example associated with TDD UL-DL configuration #2 and normal HARQ operation.

Figure 6:
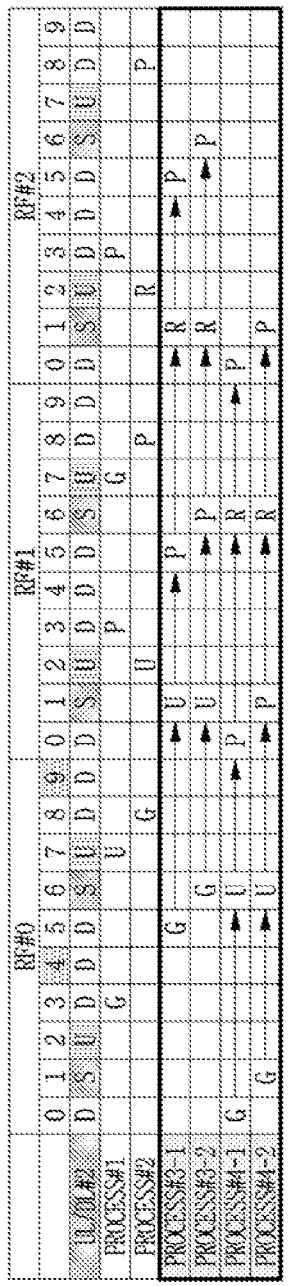

FIG. 6 illustrates a UL Grant-PUSCH-PHICH timing relationship in a 20 ms HARQ period in a special subframe (S), in TDD UL-DL configuration #2. Processes #1 and 2 are TDD HARQ processes, and HARQ processes #3-1, 3-2, 4-1, and 4-2 correspond to new HARQ timings proposed in the present disclosure. Several examples of the present disclosure will be described in association with HARQ processes #3-1, 3-2, 4-1, and 4-2 in TDD UL-DL configuration #2 and normal HARQ operation.

Next, a UL Grant-PUSCH timing relationship will be described.

In TDD UL-DL configuration #2 and normal HARQ operation, the following timing is provided. The timing of a PUSCH transmission subframe will be described based on a subframe n in which one or both of a UL grant (G) and a PHICH (P) is received.

For example, a PUSCH transmission may be performed in a subframe n+k. In the timing relationship in TDD UL-DL configuration #2, k may be defined by Tables 15 and 16 provided below. The timing relationship in Table 15 may be applied to HARQ processes #3-1 or 4-1 in the present disclosure. The timing relationship in table 16 may be applied to HARQ processes #3-2 or 4-2 in the present disclosure.

TABLE 15

| TDD UL/DL Configuration | subframe number n |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 2 |  | 6 |  |  | 4 |  | 6 |  |  | 4 |

TABLE 16

| TDD UL/DL Configuration | subframe number n |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 2 |  | 5 |  |  | 4 |  | 5 |  |  | 4 |

Next, a PUSCH-PHICH timing relationship will be described.

When a PUSCH is transmitted in a subframe n on a serving cell c, an eNB may perform a PHICH transmission through a serving cell where a UL grant has been transmitted in a subframe n+$k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 17 or Table 18 provided below. Table 17 may be applied to HARQ processes #3-1 or 4-1 in the present disclosure. Table 18 may be applied to HARQ processes #3-2 or 4-2 in the present disclosure.

TABLE 17

| TDD UL/DL Configuration | subframe index n |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 2 |  |  | 4 | 6 |  |  |  | 4 | 6 |  |

TABLE 18

| TDD UL/DL Configuration | subframe index n |   |   |   |   |   |   |   |   |   |
|---|---|---|---|---|---|---|---|---|---|---|
|  | 0 | 1 | 2 | 3 | 4 | 5 | 6 | 7 | 8 | 9 |
| 2 |  |  | 5 | 6 |  |  |  | 5 | 6 |  |

Next, a PHICH-PUSCH association will be described.

A PHICH-PUSCH association is a PUSCH transmission associated with HARQ-ACK information detected through a PHICH.

For example, a PHICH in a resource corresponding to $I_{PHICH}=0$ (which is allocated to a UE in a subframe i for TDD UL-DL configuration #2) may be associated with a PUSCH transmission in a subframe i-k. Here, k may be defined as listed in Table 19 or Table 20 provided below. Table 19 may be applied to HARQ processes #3-1 or 4-1 in the present disclosure, and Table 20 may be applied to HARQ processes #3-2 or 4-2 in the present disclosure.

TABLE 19

| TDD UL/DL Configuration | subframe number i |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 2 |   | 4 |   |   | 6 | 4 |   |   | 6 |   |

TABLE 20

| TDD UL/DL Configuration | subframe number i |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 2 |   | 5 |   | 6 |   | 5 | 6 |   |   |   |

Embodiment 4

The present embodiment 4 is an example associated with TDD UL-DL configuration #3 and normal HARQ operation.

Figure 7:
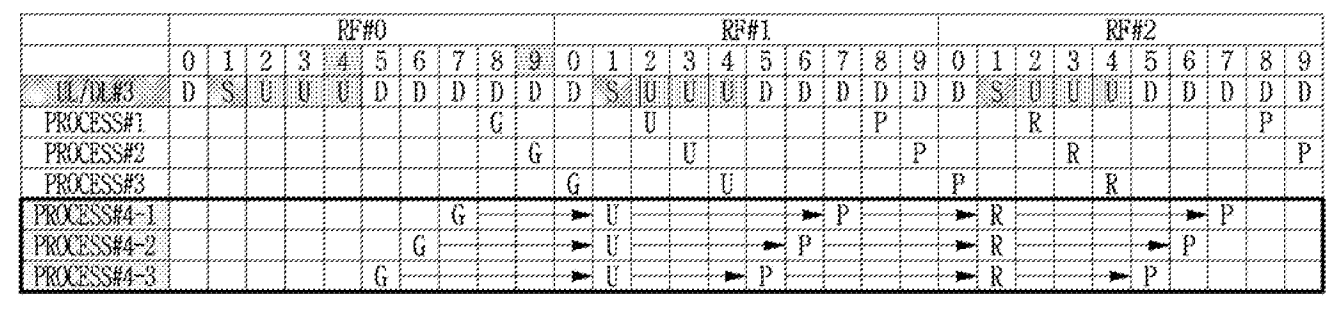

FIG. 7 illustrates a UL Grant-PUSCH-PHICH timing relationship in a 20 ms HARQ period in a special subframe (S), in TDD UL-DL configuration #3. Processes #1, 2, and 3 are TDD HARQ processes, and HARQ processes #4-1, 4-2, and 4-3 correspond to new HARQ timings. Several examples of the present disclosure will be described in association with HARQ processes #4-1, 4-2, and 4-3 in TDD UL-DL configuration #3 and normal HARQ operation.

Next, a UL Grant-PUSCH timing relationship will be described.

In TDD UL-DL configuration #3 and normal HARQ operation, the following timing is provided. Hereinafter, the timing of a PUSCH transmission subframe will be described based on a subframe n in which one or both of a UL grant (G) and a PHICH (P) is received.

For example, a PUSCH transmission may be performed in a subframe n+k. In the timing relationship in TDD UL-DL configuration #3, k may be defined by Tables 21, 22, or 23 provided below. That is, three methods (options) may be applied to a single HARQ process.

The timing relationship shown in Table 21 may be applied to HARQ process #4-1 of the present disclosure. The timing relationship shown in Table 22 may be applied to HARQ process #4-2 of the present disclosure. The timing relationship shown in Table 23 may be applied to HARQ process #4-3 of the present disclosure.

TABLE 21

| TDD UL/DL Configuration | subframe number n |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 3 |   | 4 |   |   |   |   |   | 4 | 4 | 4 |

TABLE 22

| TDD UL/DL Configuration | subframe number n |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 3 |   | 4 |   |   |   |   | 5 |   | 4 | 4 |

TABLE 23

| TDD UL/DL Configuration | subframe number n |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 3 |   | 4 |   |   |   |   | 6 |   | 4 | 4 |

Next, a PUSCH-PHICH timing relationship will be described.

When a PUSCH is transmitted in a subframe n on a serving cell c, an eNB may perform a PHICH transmission through a serving cell where a UL grant has been transmitted in a subframe n+$k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 24, Table 25, or Table 26 provided below. Table 24 may be applied to HARQ process #4-1 of the present disclosure. Table 25 may be applied to HARQ process #4-2 of the present disclosure. Table 26 may be applied to HARQ process #4-3 of the present disclosure.

TABLE 24

| TDD UL/DL Configuration | subframe index n |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 3 |   |   | 6 | 6 | 6 |   |   |   |   |   |

TABLE 25

| TDD UL/DL Configuration | subframe index n |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 3 |   |   | 5 | 6 | 6 | 6 |   |   |   |   |

TABLE 26

| TDD UL/DL Configuration | subframe index n |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 3 |   |   | 4 | 6 | 6 | 6 |   |   |   |   |

Next, a PHICH-PUSCH association will be described.

A PHICH-PUSCH association is a PUSCH transmission associated with HARQ-ACK information detected through a PHICH.

For example, a PHICH in a resource corresponding to $I_{PHICH}=0$ (which is allocated to a UE in a subframe i for TDD UL-DL configuration #3) may be associated with a PUSCH transmission in a subframe i-k. Here, $k_{PHICH}$ may be defined as listed in Table 27, Table 28, or Table 29 provided below. Table 27 may be applied to HARQ process #4-1 of the present disclosure. Table 28 may be applied to HARQ process #4-2 of the present disclosure. Table 29 may be applied to HARQ process #4-3 of the present disclosure.

TABLE 27

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 3 | 6 | | | | | | 6 | 6 | 6 | |

TABLE 28

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 3 | 6 | | | | | 5 | | 6 | 6 | |

TABLE 29

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 3 | 6 | | | | 4 | | | 6 | 6 | |

Embodiment 5

The present embodiment 5 is an example associated with TDD UL-DL configuration #4 and normal HARQ operation.

Figure 8:
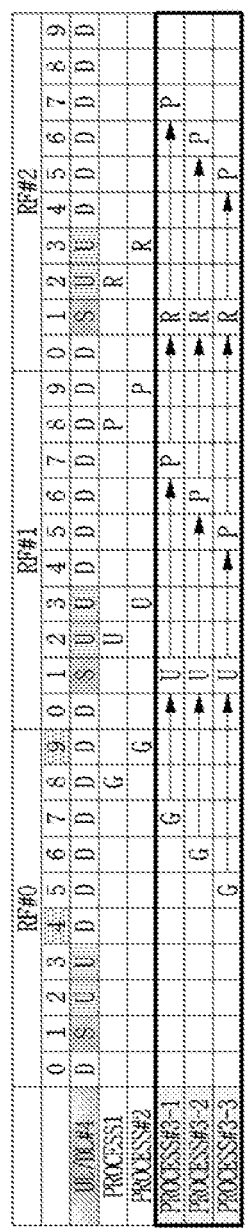

FIG. 8 illustrates a UL Grant-PUSCH-PHICH timing relationship in a 20 ms HARQ period in a special subframe (S), in TDD UL-DL configuration #4. Processes #1 and 2 are TDD HARQ processes for reference, and HARQ processes #3-1, 3-2, and 3-3 correspond to new HARQ timings proposed in the present disclosure. Hereinafter, examples of the present disclosure will be described in association with HARQ processes #3-1, 3-2, and 3-3 in TDD UL-DL configuration #4 and normal HARQ operation.

Hereinafter, a UL Grant-PUSCH timing relationship will be described.

In TDD UL-DL configuration #4 and normal HARQ operation, the following timing is provided. The timing of a PUSCH transmission subframe will be described based on a subframe n in which one or both of a UL grant (G) and a PHICH (P) is received.

For example, a PUSCH transmission may be performed in a subframe n+k. In the timing relationship in TDD UL-DL configuration #4, k may be defined by Tables 30, 31, or 32 provided below. That is, three methods (options) may be applied to a single HARQ process.

The timing relationship shown in Table 30 may be applied to HARQ process #3-1 of the present disclosure. The timing relationship shown in Table 31 may be applied to HARQ process #3-2 of the present disclosure. The timing relationship shown in Table 32 may be applied to HARQ process #3-3 of the present disclosure.

TABLE 30

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 4 | | | | | | | | 4 | 4 | 4 |

TABLE 31

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 4 | | | | | 4 | | | 5 | 4 | 4 |

TABLE 32

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 4 | | | | | 4 | | | 6 | 4 | 4 |

Next, a PUSCH-PHICH timing relationship will be described.

When a PUSCH is transmitted in a subframe n on a serving cell c, an eNB may perform a PHICH transmission through a serving cell where a UL grant has been transmitted in a subframe $n+k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 33, Table 34, or Table 35 provided below. Table 33 may be applied to HARQ process #3-1 of the present disclosure. Table 34 may be applied to HARQ process #3-2 of the present disclosure. Table 35 may be applied to HARQ process #3-3 of the present disclosure.

TABLE 33

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 4 | | 6 | 6 | 6 | | | | | | |

TABLE 34

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 4 | | 5 | 6 | 6 | | | | | | |

TABLE 35

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 4 | | 4 | 6 | 6 | | | | | | |

Next, a PHICH-PUSCH association will be described.

A PHICH-PUSCH association is a PUSCH transmission associated with HARQ-ACK information detected through a PHICH.

In one example, a PHICH in a resource corresponding to $I_{PHICH}=0$ (which is allocated to a UE in a subframe i for TDD UL-DL configuration #4) may be associated with a PUSCH transmission in a subframe i-k. Here, $k_{PHICH}$ may be defined as listed in Table 36, Table 37, or Table 38 provided below. Table 36 may be applied to HARQ process #3-1 of the present disclosure. Table 37 may be applied to HARQ process #3-2 of the present disclosure. Table 38 may be applied to HARQ process #3-3 of the present disclosure.

TABLE 36

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 4 | | | | | | | 6 | 6 | 6 | |

TABLE 37

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 4 | | | | | | 5 | | 6 | 6 | |

TABLE 38

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 4 | | | | | 4 | | | 6 | 6 | |

Embodiment 6

The present embodiment 6 is an example associated with TDD UL-DL configuration #5 and normal HARQ operation.

Figure 9:
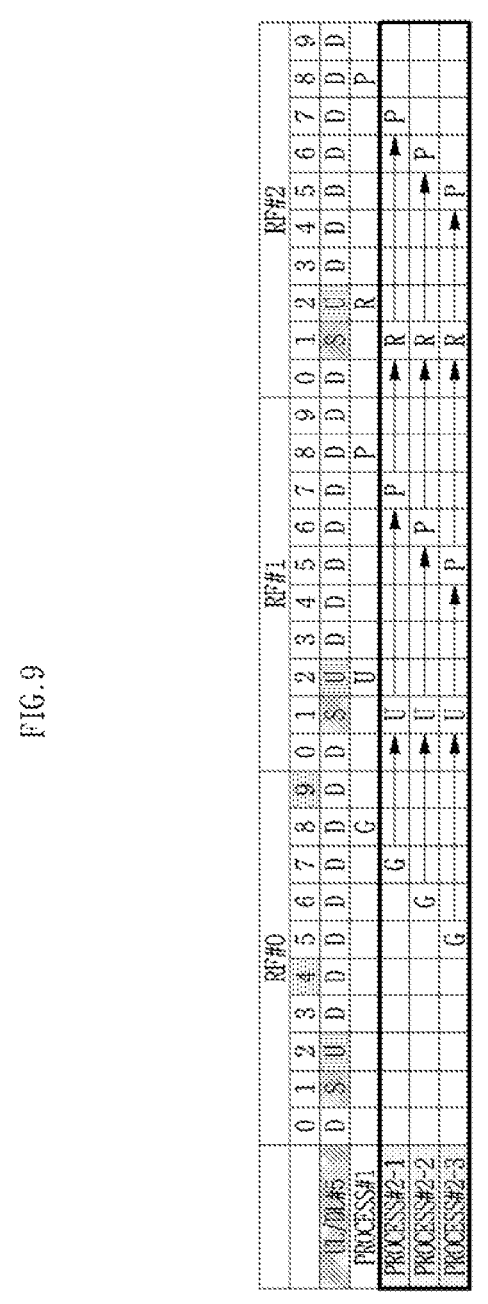

FIG. 9 illustrates a UL Grant-PUSCH-PHICH timing relationship in a 20 ms HARQ period in a special subframe (S), in TDD UL-DL configuration #5. Process #1 is a TDD HARQ process, and HARQ processes #2-1, 2-2, and 2-3 correspond to new HARQ timings proposed in the present disclosure. Several examples of the present disclosure will be described in association with HARQ processes #2-1, 2-2, and 2-3 in TDD UL-DL configuration #5 and normal HARQ operation.

Next, a UL Grant-PUSCH timing relationship will be described.

In TDD UL-DL configuration #5 and normal HARQ operation, the following timing is provided. The timing of a PUSCH transmission subframe will be described based on a subframe n in which one or both of a UL grant (G) and a PHICH (P) is received.

For example, a PUSCH transmission may be performed in a subframe n+k. In the timing relationship in TDD UL-DL configuration #5, k may be defined by Tables 39, 40, or 41 provided below. That is, three methods (options) may be applied to a single HARQ process.

The timing relationship shown in Table 39 may be applied to HARQ process #2-1 of the present disclosure. The timing relationship shown in Table 40 may be applied to HARQ process #2-2 of the present disclosure. The timing relationship shown in Table 41 may be applied to HARQ process #2-3 of the present disclosure.

TABLE 39

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 5 | | | | | | | | 4 | 4 | |

TABLE 40

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 5 | | | | | | | 5 | | 4 | |

TABLE 41

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 5 | | | | | | 6 | | | 4 | |

Next, a PUSCH-PHICH timing relationship will be described.

When a PUSCH is transmitted in a subframe n on a serving cell c, an eNB may perform a PHICH transmission through a serving cell where a UL grant has been transmitted in a subframe n+$k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 42, Table 43, or Table 44 provided below. Table 42 may be applied to HARQ process #2-1 of the present disclosure. Table 43 may be applied to HARQ process #2-2 of the present disclosure. Table 44 may be applied to HARQ process #2-3 of the present disclosure.

TABLE 42

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 5 | | 6 | 6 | | | | | | | |

TABLE 43

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 5 | | 5 | 6 | | | | | | | |

TABLE 44

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 5 | | 4 | 6 | | | | | | | |

Next, a PHICH-PUSCH association will be described.

A PHICH-PUSCH association is a PUSCH transmission associated with HARQ-ACK information detected through a PHICH.

For example, a PHICH in a resource which is allocated to a UE in a subframe i for TDD UL-DL configuration #5, may be associated with a PUSCH transmission in a subframe i-k. Here, $k_{PHICH}$ may be defined as listed in Table 45, Table 46, or Table 47 provided below. Table 45 may be applied to HARQ process #2-1 of the present disclosure. Table 46 may be applied to HARQ process #2-2 of the present disclosure. Table 47 may be applied to HARQ process #2-3 of the present disclosure.

TABLE 45

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 5 | | | | | | | | 6 | 6 | |

TABLE 46

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 5 | | | | | | | 5 | | 6 | |

TABLE 47

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 5 | | | | | | 4 | | 6 | | |

Embodiment 7

The present embodiment 7 is an example associated with TDD UL-DL configuration #6 and normal HARQ operation.

Figure 10:
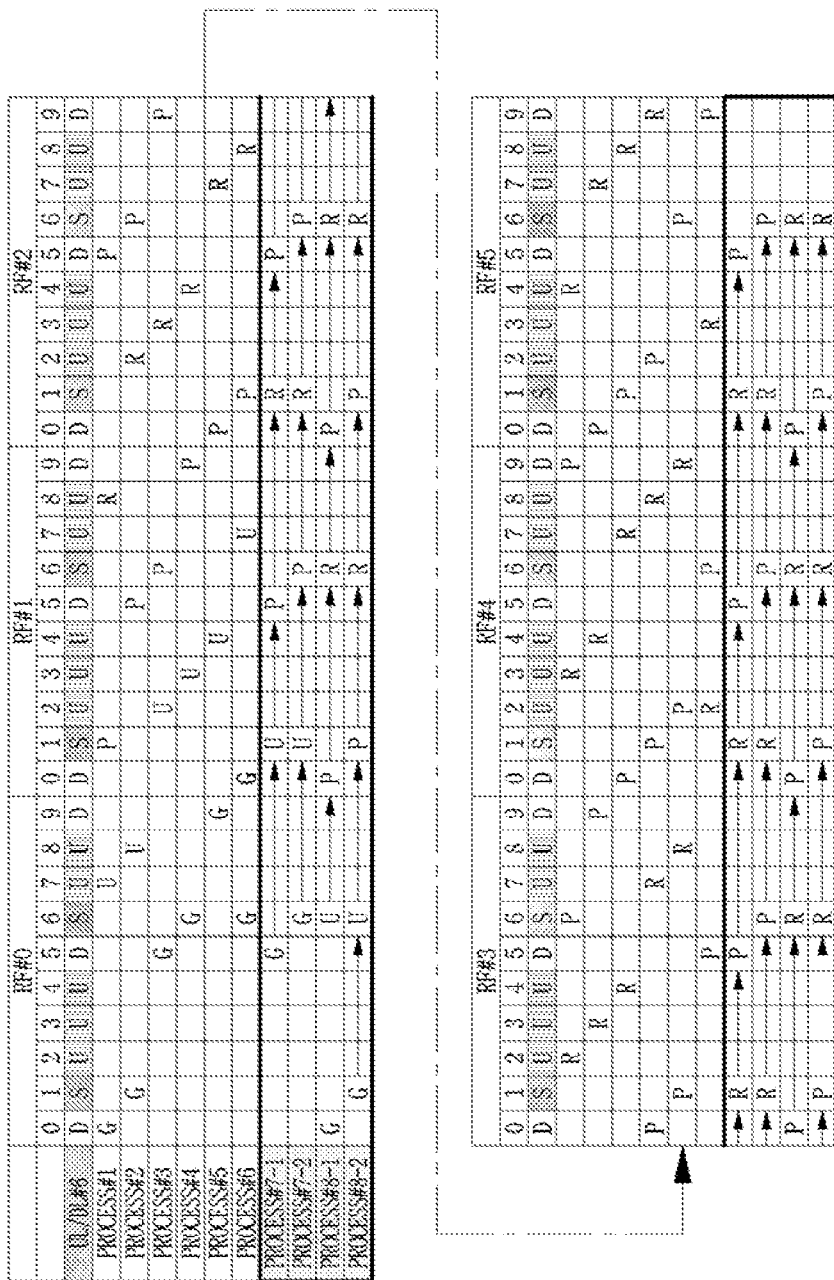

FIG. 10 illustrates a UL Grant-PUSCH-PHICH timing relationship in a 60 ms HARQ period in a special subframe (S), in TDD UL-DL configuration #6. Processes #1, 2, 3, 4, 5, and 6 are TDD HARQ processes for reference, and HARQ processes #7-1, 7-2, 8-1, and 8-2 correspond to new HARQ timings proposed in the present disclosure.

In TDD UL-DL configuration #6 and normal HARQ operation, the new HARQ processes #7-1 and 7-2 are different methods (options) for a subframe #1 (S). Also, HARQ processes #8-1 and 8-2 are different methods (options) for a subframe #6 (S).

Hereinafter, a UL index field mentioned in embodiment 7-1 and 7-2 may be replaced with a Downlink Assignment Indication (DAI) field. That is, uplink PUSCH transmission timing may be indicated using a 2-bit DAI field, without using a UL index field. Therefore, in this instance, the 2-bit DAI field exists but the UL index field may not exist in DCI format 0 or 4.

Embodiment 7-1

The present embodiment 7-1 relates to HARQ processes #7-1 or #8-1.

Next, a UL Grant-PUSCH timing relationship will be described.

In TDD UL-DL configuration #6 and normal HARQ operation, the following timing is provided. The timing of a PUSCH transmission subframe will be described based on a subframe n in which one or both of a UL grant (G) and a PHICH (P) is received.

Table 48 provided below illustrates a method of indicating new PUSCH transmission timing (special subframe) in TDD UL-DL configuration #6.

TABLE 48

| UL Index (DAI) field (2 bits) | PUSCH transmission timing corresponding to (E)PDCCH received in subframe n |
|---|---|
| MSB = 1 | 0 (n + k) |
| LSB = 1 | 1 (n + 6) |
| MSB = 1 and LSB = 1 | 2 (n + k and n + 6) |
| — | — |

In one example, a PUSCH transmission may be performed in a subframe n+k. To this end, the MSB of a UL index field which is defined by 2 bits in DCI format 0 or 4 may be set to 1, or a PHICH corresponding to $I_{PHICH}=0$ may be received in a subframe 0 or 5. Here, k may be defined as listed in Table 49 provided below.

TABLE 49

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 6 | | 7 | 7 | | | | 7 | 7 | | 5 |

In another example, a PUSCH transmission may be performed in a subframe n+6. To this end, the LSB of a UL index field which is defined by 2 bits in DCI format 0 or 4 may be set to 1, or a PHICH corresponding to $I_{PHICH}=1$ may be received in a subframe 0 or 5.

In the above examples, $I_{PHICH}$ may be 1 in the case of TDD UL-DL configuration #6 with PUSCH transmission in subframe n=1 or 6. Otherwise, $I_{PHICH}$ may be 0.

When a UE receives an (E)PDCCH that has a 2-bit UL index field of which a value in DCI format 0 or 4 is set to "11" in a subframe n, PUSCH transmissions may be performed in both of the subframe n+k and the subframe n+6 of the above examples.

In another example, a PUSCH transmission may be performed in a subframe n+k. To this end, the value of a UL index (DAI) field which is defined by 2 bits in DCI format 0 or 4 may be set to 0, or a PHICH corresponding to $I_{PHICH}=0$ may be received in a subframe 0 or 5. Here, k may be defined as listed in Table 49 provided below.

In another example, a PUSCH transmission may be performed in a subframe n+6. To this end, the value of a UL index (DAI) field which is defined by 2 bits in DCI format 0 or 4 may be set to 1, or a PHICH corresponding to $I_{PHICH}=1$ may be received in a subframe 0 or 5.

When a UE receives an (E)PDCCH that has a 2-bit UL index (DAI) field of which a value in DCI format 0 or 4 is set to 2 ("10"), in a subframe n, PUSCH transmissions may be performed in both of the subframe n+k and the subframe n+6 of the above examples.

Table 50 provided below illustrates a method of indicating a new PUSCH transmission timing (special subframe) in TDD UL-DL configuration #6.

TABLE 50

| UL Index (DAI) field (2 bits) | PUSCH transmission timing corresponding to (E)PDCCH received in subframe n |
|---|---|
| 00 | 0 (n + k) |
| 01 | 1 (n + 6) |
| 10 | 2 (n + k and n + 6) |
| 11 | — |

Next, a PUSCH-PHICH timing relationship will be described.

When a PUSCH is transmitted in a subframe n on a serving cell c, an eNB may perform a PHICH transmission through a serving cell where a UL grant has been transmitted in a subframe n+$k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 51 provided below.

TABLE 51

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 6 | | 4 | 4 | 6 | 6 | | | 4 | 4 | 7 |

Next, a PHICH-PUSCH association will be described.

A PHICH-PUSCH association is a PUSCH transmission associated with HARQ-ACK information detected through a PHICH.

In one example, a PHICH in a resource corresponding to $I_{PHICH}=0$ (which is allocated to a UE in a subframe i for TDD UL-DL configuration #6) may be associated with a PUSCH transmission in a subframe i-k. Here, k may be defined as listed in Table 52 provided below.

TABLE 52

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 6 | | 6 | 4 | | | 7 | 4 | | | 6 |

In another example, a PHICH in a resource corresponding to $I_{PHICH}=1$ (which is allocated to a UE in a subframe i for TDD UL-DL configuration #6) is associated with a PUSCH transmission in a subframe i-4.

Embodiment 7-2

The present embodiment 7-2 relates to HARQ processes #7-2 or #8-2.

Next, a UL Grant-PUSCH timing relationship will be described.

In TDD UL-DL configuration #6 and normal HARQ operation, the following timing is provided. The timing of a PUSCH transmission subframe will be described based on a subframe n in which one or both of a UL grant (G) and a PHICH (P) is received. Each timing value provided below may be indicated by a predetermined field in a UL grant as shown in Table 53 or 54.

Tables 53 and 54 provided below illustrate different signaling methods for indicating a new PUSCH transmission timing (special subframe) in TDD UL-DL configuration #6.

TABLE 53

| UL Index (DAI) field (2 bits) | PUSCH transmission timing corresponding to (E)PDCCH received in subframe n |
|---|---|
| MSB = 1 | 0 (n + k) |
| LSB = 1 | 1 (n + 5) |
| MSB = 1 and LSB = 1 | 2 (n + k and n + 5) |
| — | — |

TABLE 54

| UL Index (DAI) field (2 bits) | PUSCH transmission timing corresponding to (E)PDCCH received in subframe n |
|---|---|
| 00 | 0 (n + k) |
| 01 | 1 (n + 5) |
| 10 | 2 (n + k and n + 5) |
| 11 | — |

In one example, a PUSCH transmission may be performed in a subframe n+k. To this end, the MSB of a UL index field which is defined by 2 bits in DCI format 0 or 4 may be set to 1, or a PHICH corresponding to $I_{PHICH}=0$ may be received in a subframe 1 or 6. Here, k may be defined as listed in Table 55 provided below.

TABLE 55

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 6 | | 7 | 7 | | | | 7 | 7 | | 5 |

In another example, a PUSCH transmission may be performed in a subframe n+5. To this end, the LSB of a UL index field which is defined by 2 bits in DCI format 0 or 4 may be set to 1, or a PHICH corresponding to $I_{PHICH}=1$ may be received in a subframe 1 or 6.

In the above examples, $I_{PHICH}$ may be 1 in the case of TDD UL-DL configuration #6 with PUSCH transmission in subframe n=1 or 6. Otherwise, $I_{PHICH}$ may be 0.

When a UE receives an (E)PDCCH that has a 2-bit UL index field of which a value in DCI format 0 or 4 is set to "11" in a subframe n, PUSCH transmissions may be performed in all of the subframes n+k and n+5 of the above examples.

Next, a PUSCH-PHICH timing relationship will be described.

When a PUSCH is transmitted in a subframe n on a serving cell c, an eNB may perform a PHICH transmission through a serving cell where a UL grant has been transmitted in a subframe n+$k_{PHICH}$. This transmission may proceed through a serving cell c in self-carrier scheduling, and through another serving cell in cross-carrier scheduling if Carrier Aggregation (CA) is applied. Here, $k_{PHICH}$ may be defined as listed in Table 56 provided below.

TABLE 56

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 6 | | 5 | 4 | 6 | 6 | | 5 | 4 | 7 | |

Next, a PHICH-PUSCH association will be described.

A PHICH-PUSCH association is a PUSCH transmission associated with HARQ-ACK information detected through a PHICH.

In one example, a PHICH in a resource corresponding to $I_{PHICH}=0$ (which is allocated to a UE in a subframe i for TDD UL-DL configuration #6) may be associated with a PUSCH transmission in a subframe i-k. Here, k may be defined as listed in Table 57 provided below.

TABLE 57

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 6 | 6 | 6 | 4 | | | 7 | 4 | | | 6 |

In another example, a PHICH in a resource corresponding to $I_{PHICH}=1$ (which is allocated to a UE in a subframe i for TDD UL-DL configuration #6) is associated with a PUSCH transmission in a subframe i-5.

The methods for supporting a synchronous HARQ operation for a new PUSCH transmission in a special subframe according to all of the TDD UL-DL configurations have been proposed. Table 58 provides the maximum number of HARQ processes for an uplink normal HARQ operation according to each TDD-UL-DL configuration for each UE through the above described methods.

TABLE 58

| TDD UL/DL configuration | Number of HARQ processes for normal HARQ operation |
|---|---|
| 0 | 9 or 11 |
| 1 | 6 |
| 2 | 4 |
| 3 | 4 |
| 4 | 3 |
| 5 | 2 |
| 6 | 8 or 10 |

Figure 11:
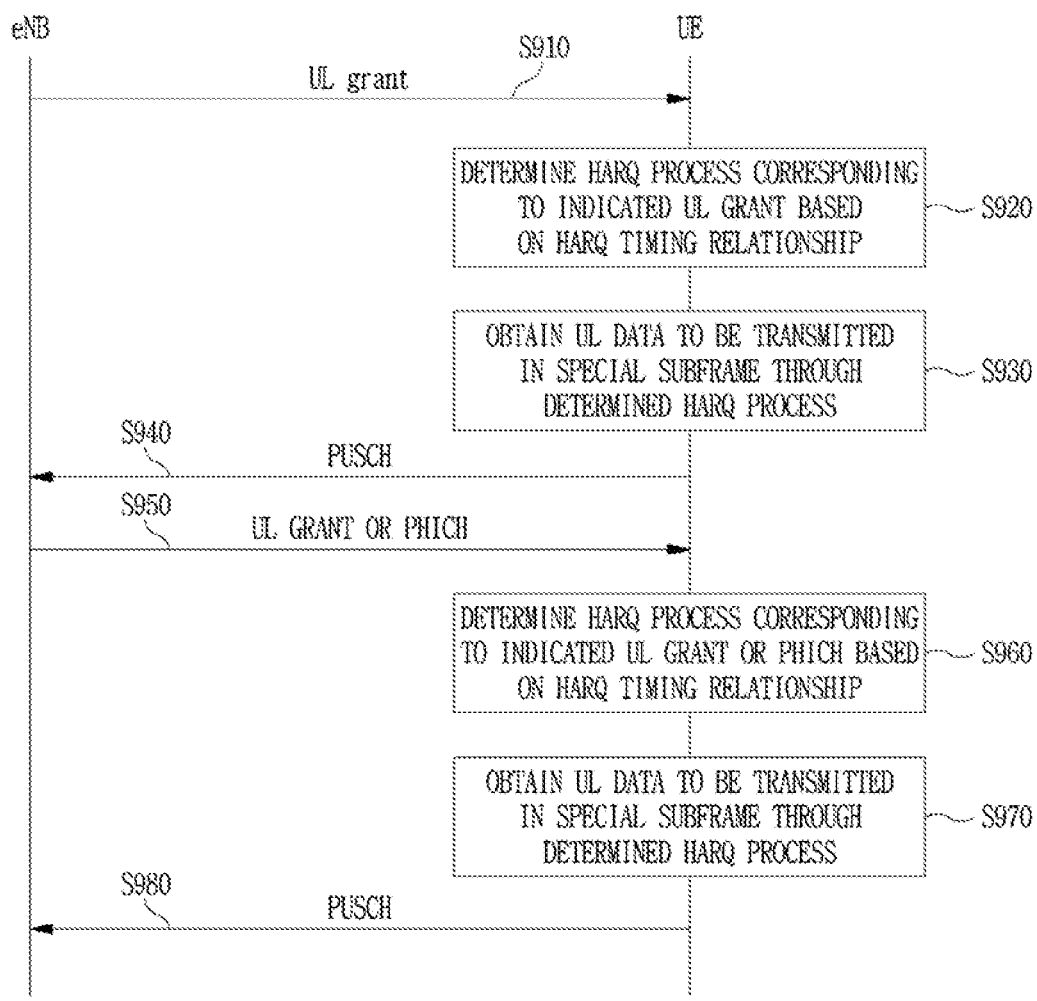
FIG. 11 is a diagram illustrating operations of a user equipment (UE) and an evolved node B (eNB) according to an embodiment of the present disclosure.

FIG. 11 is a diagram illustrating operations of a user equipment (UE) and an evolved nodeB (eNB) according to an embodiment of the present disclosure.

In operation S910, a UE receives a UL grant from an eNB. An initial transmission of a UE's UL data or an adaptive retransmission may be indicated through a UL grant (e.g., DCI format 0 or 4 received through an (E)PDCCH). The present disclosure assumes that an initial transmission is indicated.

In operation S920, when the subframe for a UL data transmission (e.g., a PUSCH transmission) corresponds to a special subframe, the UE may determine a HARQ process corresponding to an indicated UL grant or a PHICH, based on a HARQ timing relationship according to the TDD UL-DL configuration in the various embodiments of the present disclosure. For example, according to the present disclosure, the UE (i.e., a processor of the UE) may determine HARQ timing by taking into consideration the TDD UL-DL configuration for the corresponding UE, and the set value (MSB, LSB, and MID) of an index field. Regarding the above, the processor may store and use the above described Tables 1 through 49, or may calculate/derive a timing listed in the tables using a TDD UL-DL configuration, the set value (MSB, LSB, and MID) of a UL index field, and an $I_{PHICH}$.

In operation S930, the UE obtains UL data to be transmitted in a special subframe through the determined HARQ process. In the case of a UL data initial transmission the UE may obtain new data from another entity (e.g., multiplexing and assembly entity) in a higher layer, and in the case of retransmission the UE may prepare data for transmission which exists in a HARQ buffer.

In operation S940, the UE transmits the UL data in a special subframe through a PUSCH.

In operation S950, the UE receives a UL grant or a PHICH. This may be a UL grant indicating transmission of new UL data instead of UL data that has been transmitted in operation S940. Alternatively, this may be a UL grant or HARQ feedback information which indicates adaptive or nonadaptive retransmission of UL data which has been transmitted in operation S940. The present disclosure uses an example in which adaptive retransmission of UL data is indicated. Accordingly, HARQ feedback information (i.e., ACK/NACK information) with respect to the previously transmitted UL data may be received by the UE through the PHICH, or nonadaptive retransmission of the UL data may be indicated.

In operations S910 to S950, a subframe in which a UL grant or a PHICH is received is referred to as a first subframe, a subframe in which a PUSCH is transmitted is referred to as a second subframe, and a subframe in which HARQ feedback information (i.e., a PHICH) is received in response to the transmitted PUSCH is referred to as a third subframe. Here, a timing relationship described according to a TDD UL-DL configuration in various embodiments of the present disclosure may be applied to a timing relationship among the first, second, and third subframes.

Operations S960 and S970 may determine a HARQ process and may obtain UL data to be transmitted, similar to operations S920 and S930. In operation S960, when a subframe in which a UL data transmission (e.g., a PUSCH transmission) is to be performed corresponds to a special subframe, the UE may determine a HARQ process corresponding to an indicated UL grant or a PHICH, based on a HARQ timing relationship according to the TDD UL-DL configuration in the various embodiments of the present disclosure. For example, the UE (i.e., a processor of the UE) according to the present disclosure may determine a HARQ timing by taking into consideration the TDD UL-DL configuration for the corresponding UE, the set value (MSB, LSB, and MID) of a UL index field, $I_{PHICH}$, or the like. Regarding the above, the processor may store and use the above described Tables 1 to 49, or may calculate/derive a timing listed in the tables using a TDD UL-DL configuration, the set value (MSB, LSB, and MID) of a UL index field, and an $I_{PHICH}$. In operation S970, the UE obtains UL data to be transmitted in a special subframe through the determined HARQ process. In the case of UL data retransmission, the UE may prepare data for transmission which exists in a HARQ buffer.

In operation S980, the UE transmits the obtained UL data to an eNB through a PUSCH.

In operations S950 to S980, a timing relationship described according to a TDD UL-DL configuration in various embodiments of the present disclosure may be applied to a timing relationship between a subframe in which a UL grant or a PHICH is received and a subframe in which a PUSCH is transmitted.

In the example of FIG. 11, initial transmission of UL data may be performed in operation S940 and retransmission of the corresponding UL data may be performed in operation S980. However, this example may not be limited to these operations.

Figure 12:
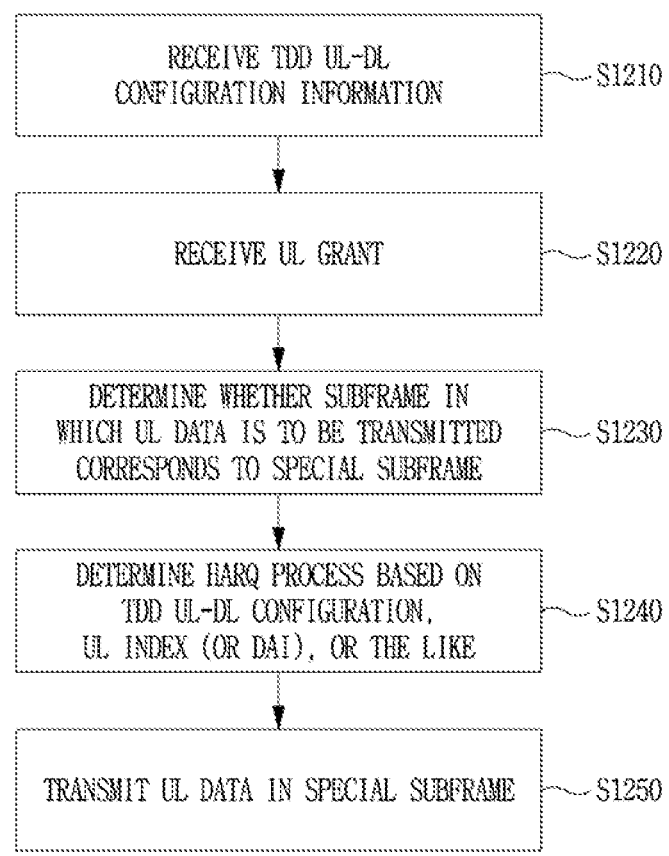
FIG. 12 is a diagram illustrating a UL transmission operation of a UE according to the present disclosure.

FIG. 12 is a diagram illustrating the UL transmission operation of a UE according to the present disclosure.

In operation S1210, a UE receives a TDD UL-DL configuration from an eNB. The TDD UL-DL configuration may be received through higher layer signaling, such as SIB signaling or RRC signaling, or may be semi-statically set.

In operation S1220, the UE receives a UL grant. The UL grant may include scheduling information associated with UL data transmission. Accordingly, the UE may determine the subframe in which a UL data transmission (e.g., a PUSCH transmission) is to be performed. The UE determines both a UL index field (or DAI) in DCI format 0 or 4 of the UL grant and the LSB/MSB of the corresponding field, so as to determine the subframe in which the transmission is performed. For example, the value of the index field may be set to 2 bits. The UE may determine a subframe that is different based on the set bit value, that is, the PUSCH transmission timing.

In operation S1230, the UE determines whether a subframe for a UL data transmission is a special subframe. One or more embodiments are applied in a configuration where the subframe in which the UL data transmission is scheduled is a special subframe.

In operation S1240, the UE determines a HARQ timing relationship based on a TDD UL-DL configuration, the UL index information (or a DAI instead of a UL index) of 2 bits or 3 bits, and the like. A HARQ process may be determined based on the HARQ timing relationship.

In operation S1250, the UE may obtain UL data to be transmitted in a special subframe from either the determined HARQ process or from a HARQ buffer, and may transmit the same through a physical channel.

Although the above described illustrative methods are expressed as a series of operations for ease of description, they do not limit the order of operations executed, and the operations may be executed in parallel or in a different order. Also, all of the operations described above may not always be required to implement the method of the present disclosure.

The above described embodiments may include examples of various aspects of the present disclosure. Although it is difficult to describe all the possible combinations showing the various aspects, other combinations are possible. Therefore, it should be understood that the present disclosure includes other substitutions, corrections, and modifications within the scope of the claims.

The scope of the present disclosure includes an apparatus that processes or implements the operations above according to various embodiments of the present disclosure (e.g., a wireless device and elements thereof, which will be described with reference to FIG. 13).

Figure 13:
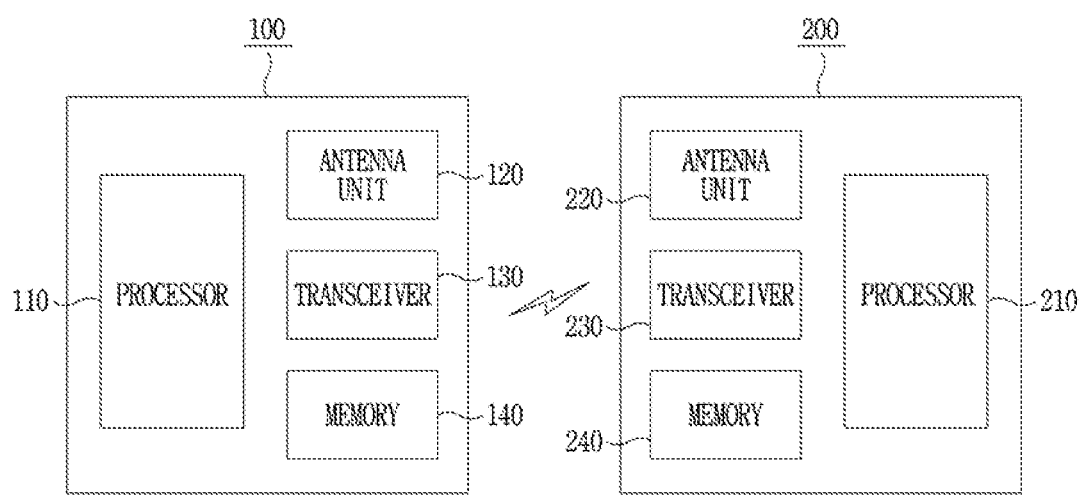
FIG. 13 is a diagram illustrating a configuration of a wireless device according to the present disclosure.

FIG. 13 is a diagram illustrating a configuration of a wireless device according to the present disclosure.

FIG. 13 illustrates a UE 100 that corresponds to an example of a downlink receiving device or an uplink transmitting device, and an eNB 200 that corresponds to an example of a downlink transmitting device or an uplink receiving device.

The UE 100 may include a processor 110, an antenna unit 120, a transceiver 130, and a memory 140.

The processor 110 processes signals related to a baseband, and may include a first module and a second module. The first module may correspond to a higher layer processing unit, and may process the operations of a Medium Access Control (MAC) layer, a Radio Resource Control (RRC) layer, or a higher layer. The second module may correspond to a physical layer processing unit, and may process the operations of a physical (PHY) layer (e.g., uplink transmission signal processing or downlink reception signal processing). However, this may not be limited thereto. The first and the second modules may be formed as a single module, or three or more modules may be separately formed. The processor 110 may control the general operations of the UE 100, in addition to processing signals related to a baseband.

The antenna unit 120 may include one or more physical antennas, and may support MIMO transmission/reception when a plurality of antennas is included. The transceiver 130 may include a Radio Frequency (RF) transmitter and an RF receiver. The memory 140 may store information processed by the processor 110, as well as software, an OS, applications, or the like associated with the operations of the UE 100, and may include elements such as a buffer or the like.

The eNB 200 may include a processor 210, an antenna unit 220, a transceiver 230, and a memory 240.

The processor 210 processes signals related to a baseband, and may include a first module and a second module. The first module may correspond to a higher layer processing unit, and may process the operations of a Medium Access Control (MAC) layer, a Radio Resource Control (RRC) layer, or a higher layer. The second module may correspond to a physical layer processing unit, and may process the operations of a physical (PHY) layer (e.g., uplink reception signal processing or downlink transmission signal processing). However, this may not be limited thereto. The first and the second modules may be formed as a single module, or three or more modules may be separately formed. The processor 210 may control the general operations of the eNB 200, in addition to processing signals related to a baseband.

The antenna unit 220 may include one or more physical antennas, and may support MIMO transmission/reception when a plurality of antennas are included. The transceiver 230 may include an RF transmitter and an RF receiver. The memory 240 may store information processed by the processor 210, software, an operating system, applications, or the like associated with the operations of the eNB 200, and may include elements such as a buffer or the like.

The first module of the processor 110 of the UE 100 may include a HARQ entity (or a HARQ operating unit) for obtaining a UL grant or HARQ feedback information received from an eNB through the second module. The first module (e.g., an MAC entity) of the UE includes a single HARQ entity for each serving cell. The HARQ entity may manage a plurality of parallel HARQ processes, and may allow continuous transmission by waiting for HARQ feedback with respect to successful or unsuccessful reception of a previous transmission.

When a UL grant is indicated for a Transmission Time Interval (TTI) in the corresponding TTI, the HARQ entity may determine HARQ process(es) through which a transmission is to be performed. Also, received HARQ feedback (i.e., ACK/NACK information) or the like may be transferred to HARQ process(es). Here, the HARQ entity may determine a HARQ process corresponding to the indicated UL grant or PHICH (i.e., HARQ feedback information) based on a HARQ timing relationship according to the TDD UL-DL configuration which has been described in various embodiments of the present disclosure. For example, the UE (i.e., a processor of the UE) according to the present disclosure may determine HARQ timing by taking into consideration the TDD UL-DL configuration for the corresponding UE, the set value (MSB, LSB, and MID) of a UL index field, an $I_{PHICH}$, or the like. Regarding the above, the processor may store and use the above described Tables 1 to 49, or may calculate/derive a timing listed in the tables using the above mentioned TDD UL-DL configuration, the set value (MSB, LSB, and MID) of the UL index field, and an $I_{PHICH}$.

In the case of a new UL data transmission (or an initial transmission), when a HARQ process is determined, the HARQ entity may obtain a MAC Protocol Data Unit (PDU) from a "multiplexing and assembly" entity, may transfer the obtained MAC PDU and UL grant and HARQ information to the determined HARQ process, and may provide an indication to trigger a new UL transmission in the corresponding HARQ process. In the case of an adaptive retransmission, the UL grant and HARQ information are transferred to the determined HARQ process as an indication to perform an adaptive retransmission in the corresponding HARQ process. When the UL grant is not received and a HARQ buffer of the HARQ process is not empty, the HARQ entity may provide an indication to perform a nonadaptive retransmission in the determined HARQ process. Accordingly, the second module of the processor 110 of the UE 100 may include a PUSCH mapping and transmitting unit that receives information required for the initial transmission or retransmission of UL data from the HARQ entity of the first module, and then transmits the UL data to the eNB. Here, according to the present disclosure, a PUSCH may be mapped to a special subframe and may be transmitted to the eNB.

The first module of the processor 210 of the eNB 200 may include a UL grant (or DCI) generating unit or a HARQ feedback information generating unit for providing an indication that a UE will transmit UL data in a special subframe. The second module of the processor 210 of the eNB 200 may include a DCI mapping and transmitting unit for transmitting a UL grant transferred from the first module to the UE through a PDCCH or an EPDCCH, and may also include a HARQ feedback information mapping and transmitting unit for transmitting HARQ feedback information transferred from the first module to the UE through a PHICH. Also, the second module may further include a UL data receiving unit for receiving a PUSCH from the UE, demodulating the PUSCH, and transferring the same to the first module. Also, the first module may further include a HARQ entity for receiving UL data, decoding the UL data, and generating HARQ feedback information.

The above described operations of the processor 110 of the UE 100 or the processor 210 of the eNB 200 may be implemented by software processing or hardware processing, or may be implemented by software and hardware processing.

Furthermore, the processor 110 of the UE 100 of the embodiment may control to receive an Uplink (UL) grant from a base station, the UL grant being included in a downlink time period of Time Division Duplex (TDD) cell, wherein the TDD cell having TDD UL/DL configuration 1, 2 or 6; determine a resource in an Uplink Pilot Time Slot (UpPTS) of a special subframe of the TDD cell to transmit a PUSCH associated with the received UL grant, wherein the special subframe, having subframe number 1 or 6, consists of a Downlink Pilot Time Slot (DwPTS), a guard period (GP), and the UpPTS; transmit, from the UE, the PUSCH mapped to the resource in the UpPTS; and receive a Physical Hybrid Automatic Repeat Request Indicator Channel (PHICH) responsive to the PUSCH.

More, the processor 110 of the UE 100 of the embodiment may control to determine, based on whether a PUSCH transmission occurs in a special subframe or an uplink subframe, a transmission time length of the PUSCH differently from a transmission time length of a different PUSCH transmitted in an uplink subframe of the TDD cell. In here, the processor 110 of the UE 100 may control to receive a different UL grant from the base station; determine a different resource in an uplink subframe of the TDD cell to transmit a different PUSCH associated with the received different UL grant; and determine, by the UE, a transmission time length of the PUSCH to be shorter than a transmission time length of the different PUSCH.

Wherein the DwPTS of the special subframe corresponds to six Orthogonal Frequency Division Multiplexing (OFDM) symbols, and wherein the GP of the special subframe has a time period shorter than three OFDM symbols, wherein the downlink time period of the TDD cell corresponds to a downlink subframe when the TDD cell is configured to have TDD UL/DL configuration 1 or 6, and wherein the downlink time period of the TDD cell corresponds to a DwPTS of a different special subframe when the TDD cell is configured to have TDD UL/DL configuration 2.

When the TDD cell is configured to have TDD UL/DL configuration 6, the UE of the embodiment may process to receive a UL index field associated with the UL grant from the base station; and determine, based on a value of the UL index field, a different configuration for a time interval between the UL grant and the PUSCH. More, when the TDD cell is configured to have TDD UL/DL configuration 6, the UE may process to receive a UL index field associated with the UL grant from the base station; and in response to receiving the UL grant in subframe n and determining that least significant bit (LSB) of the UL index field is 1, determining to transmit the PUSCH in special subframe n+6, where n is 0 or 5. More details, the UE of the embodiment may process and perform a whole operation of a claimed process or in each of a separated operation of the claimed process.

What is claimed is:

1. A non-transitory computer-readable medium storing instructions that, when executed, cause a wireless user device to:
   receive, during a downlink (DL) time period of time division duplex (TDD) cell, an uplink (UL) grant, wherein the TDD cell is configured with TDD UL/DL configuration 1, 2 or 6;
   transmit, based on a resource in an uplink pilot time slot (UpPTS) of a special subframe of the TDD cell, a physical uplink shared channel (PUSCH) signal associated with the UL grant, wherein the special subframe, having subframe number 1 or 6, comprises a downlink pilot time slot (DwPTS), a guard period (GP), and the UpPTS;
   receive a physical hybrid automatic repeat request indicator channel (PHICH) signal responsive to the PUSCH signal; and
   while the TDD cell is configured with TDD UL/DL configuration 6:
   receive a UL index field associated with the UL grant; and
   based on reception of the UL grant in subframe n and a determination that least significant bit (LSB) of the UL index field is 1, determine to transmit the PUSCH signal in special subframe n+6, where n is 0 or 5.

2. The non-transitory computer-readable medium of claim 1, wherein the instructions, when executed, cause the wireless user device to determine, based on whether a PUSCH transmission occurs in a special subframe or an uplink subframe, a transmission time length of the PUSCH transmission differently from a transmission time length of an other PUSCH transmission transmitted in an uplink subframe of the TDD cell.

3. The non-transitory computer-readable medium of claim 1, wherein the instructions, when executed, cause the wireless user device to:
   receive an other UL grant;
   determine an other resource in an uplink subframe of the TDD cell to transmit an other PUSCH signal transmission associated with the other UL grant; and determine a transmission time length of the PUSCH signal transmission to be shorter than a transmission time length of the other PUSCH transmission.

4. The non-transitory computer-readable medium of claim 1, wherein the DwPTS of the special subframe corresponds to six orthogonal frequency division multiplexing (OFDM) symbols, and
wherein the GP of the special subframe has a time period shorter than three OFDM symbols.

5. The non-transitory computer-readable medium of claim 1, wherein the DL time period of the TDD cell corresponds to a downlink subframe while the TDD cell is configured with TDD UL/DL configuration 1 or 6.

6. The non-transitory computer-readable medium of claim 1, wherein the instructions, when executed, cause the wireless user device to, while the TDD cell is configured with TDD UL/DL configuration 6:
receive a second UL index field associated with the UL grant; and
determine, based on a value of the second UL index field, a different configuration for a time interval between reception of the UL grant and the PUSCH signal transmission.

7. The non-transitory computer-readable medium of claim 1, wherein the instructions, when executed, cause the wireless user device to determine, while the TDD cell is configured with TDD UL/DL configuration 6 and based on a determination that most significant bit (MSB) of the UL index field is 1, at least one alternative uplink subframe that is available for transmitting the PUSCH signal.

8. A non-transitory computer-readable medium storing instructions that, when executed, cause a wireless user device to:
receive, during a downlink (DL) time period of time division duplex (TDD) cell, an uplink (UL) grant;
transmit, based on a resource in an uplink pilot time slot (UpPTS) of a special subframe of the TDD cell, a Physical Uplink Shared Channel (PUSCH) signal associated with the UL grant, wherein the special subframe, having subframe number 1, comprises a downlink pilot time slot (DwPTS), a guard period (GP), and the UpPTS;
receive a physical hybrid automatic repeat request indicator channel (PHICH) signal responsive to the PUSCH signal; and
while the TDD cell is configured with TDD UL/DL configuration 6:
receive a UL index field associated with the UL grant; and
based on reception of the UL grant in subframe 5 of radio frame m and a determination that least significant bit (LSB) of the UL index field is 1, determine to transmit the PUSCH signal in special subframe 1 of radio frame m+1, where m is an integer, wherein the UL grant is received in a downlink subframe having subframe number 5.

9. The non-transitory computer-readable medium of claim 8, wherein while the TDD cell is configured to have TDD UL/DL configuration 3, 4, or 5, a second UL grant is received in a downlink subframe having subframe number 7.

10. The non-transitory computer-readable medium of claim 8, wherein while the TDD cell is configured to have TDD UL/DL configuration 2, a second UL grant is received in a downlink subframe having subframe number 6.

11. The non-transitory computer-readable medium of claim 8, wherein the instructions, when executed, cause the wireless user device to determine, based on whether a PUSCH signal transmission occurs in a special subframe or an uplink subframe, a transmission time length of the PUSCH signal transmission differently from a transmission time length of an other PUSCH signal transmission transmitted in an uplink subframe of the TDD cell.

12. The non-transitory computer-readable medium of claim 8, wherein the instructions, when executed, cause the wireless user device to:
receive an other UL grant;
determine an other resource in an uplink subframe of the TDD cell to transmit an other PUSCH signal associated with the other UL grant; and
determine a transmission time length of the PUSCH signal transmission to be shorter than a transmission time length of the other PUSCH signal transmission.

13. The non-transitory computer-readable medium of claim 8, wherein the UpPTS of the special subframe corresponds to six orthogonal frequency division multiplexing (OFDM) symbols.

14. The non-transitory computer-readable medium of claim 8, wherein the DwPTS of the special subframe corresponds to six orthogonal frequency division multiplexing (OFDM) symbols, and
wherein the GP of the special subframe has a time period shorter than three OFDM symbols.

15. The non-transitory computer-readable medium of claim 8, wherein the DL time period of the TDD cell corresponds to a downlink subframe while the TDD cell is configured with TDD UL/DL configuration 6.

16. The non-transitory computer-readable medium of claim 8, wherein the instructions, when executed, cause the wireless user device to, while the TDD cell is configured with TDD UL/DL configuration 6:
receive a UL index field associated with the UL grant; and
determine, based on a value of the UL index field, an other configuration for a time interval between reception of the UL grant and the PUSCH signal transmission.

* * * * *